US012769185B2

(12) United States Patent
Gnan et al.

(10) Patent No.: US 12,769,185 B2
(45) Date of Patent: Oct. 20, 2026

(54) IN-CHAMBER DEVICE AND METHOD FOR CALIBRATING A TUNABLE-FOCUS CAMERA SYSTEM

(71) Applicant: Datalogic IP Tech S.R.L., Calderara di Reno (IT)

(72) Inventors: Marco Gnan, Bologna (IT); Cosimo Lovecchio, Bologna (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 46 days.

(21) Appl. No.: 18/598,931

(22) Filed: Mar. 7, 2024

(65) Prior Publication Data

US 2025/0284179 A1 Sep. 11, 2025

(51) Int. Cl.
*G03B 13/36* (2021.01)
*G03B 15/02* (2021.01)
*G03B 17/17* (2021.01)

(52) U.S. Cl.
CPC ............. *G03B 13/36* (2013.01); *G03B 15/02* (2013.01); *G03B 17/17* (2013.01)

(58) Field of Classification Search
CPC ........ G03B 13/36; G03B 15/02; G03B 17/17; G03B 17/02; G03B 17/14; H04N 23/51; H04N 23/55; H04N 23/56
See application file for complete search history.

(56) References Cited

U.S. PATENT DOCUMENTS 5,434,632 A * 7/1995 Carmichael .............. H04N 9/28 353/101
7,253,384 B2 8/2007 Barnes et al.
8,387,884 B2 3/2013 Vinogradov
8,487,228 B2 7/2013 Nunnink
11,611,693 B1 3/2023 Sheldon et al.
2014/0218590 A1 8/2014 Nunnink
2016/0191911 A1 6/2016 Filhaber et al.
2020/0209519 A1 * 7/2020 Gladnick ............. H04N 17/002
2021/0405267 A1 12/2021 Oteo et al.

FOREIGN PATENT DOCUMENTS

CN 116224608 A 6/2023

OTHER PUBLICATIONS

Extended European Search Report on EP 25162142.1 dated Jun. 10, 2025, 13 pgs.

* cited by examiner

*Primary Examiner* — Christopher E Mahoney
(74) *Attorney, Agent, or Firm* — Foley & Lardner LLP

(57) ABSTRACT

An in-chamber device and method for calibrating a tunable-focus camera system may include an optical chamber that includes a housing, camera sensor, camera receiving lens, and illumination source. The housing may define an aperture, and the camera sensor may be disposed within the housing. The camera receiving lens may be disposed in the aperture and configured to enable light external of the optical chamber to be focused onto the camera sensor. The illumination source may be configured to output an illumination signal that is incident the camera receiving lens along a first axis via the camera receiving lens. The illumination signal may be reflected from a reflective element as a reflected illumination signal back through a second axis via the camera receiving lens so as to enable the reflected illumination signal to be sensed. The optical chamber may be used to automatically calibrate the tunable-focus camera system periodically or aperiodically.

20 Claims, 14 Drawing Sheets

Look-up Table 1200

| Driving Signal $D_s$ (1202) | Focus Distance $F_D$ (1204) | Detector Signal $S$ (1206) |
|---|---|---|
| $D_{s1}$ | $F_{D1}$ | $S_1$ |
| $D_{s2}$ | $F_{D2}$ | $S_2$ |
| $D_{s3}$ | $F_{D3}$ | $S_3$ |
| ... | ... | ... |

FIG. 12

IN-CHAMBER DEVICE AND METHOD FOR CALIBRATING A TUNABLE-FOCUS CAMERA SYSTEM

BACKGROUND

A camera system using a tunable-focus lens (or tunable lens) may achieve focus at a number of distances (referred to as focus distances) by adjusting the position of a focal plane with respect to a camera sensor. Achieving focus by the tunable lens may be performed by physically moving the lens or by changing the optical power of the lens. The optical power of the lens may be changed either by shifting the lens elements within the lens while the outer lens barrel stays substantially still and unchanged, as in a classical zoom lens, or by changing the curvature of one or more optical elements within the lens, such as in a liquid lens. In the latter case, such elements may be made with a special technology that enables the elements to be physically deformed in a controlled way. Such tunable lenses may be affected by random changes that reduce the focus distance accuracy of the camera system. For example, a tunable lens may be affected by unpredictable and irreversible ageing drift that may impair the optical stability of the tunable lens and the performance of the camera system over time. A focus distance calibration can be performed to restore the focus distance accuracy of the tunable lens, thereby improving the optical stability of the tunable lens and the performance of the camera system. However, the focus distance calibration requires a dedicated setup process and oversight from a skilled technician or operator to ensure that the calibration is performed successfully. As such, there is a need to perform a focus distance calibration of a tunable lens without requiring external setup or technician intervention.

A tunable lens within a camera system may be affected by the age of the lens, age of the system, temperature of the camera system and camera system components, and system operating temperature. In many cases, the effect of temperature on a tunable lens within a camera system is accounted for during a focus calibration routine performed before regular device operation. For example, the effect of temperature may be recorded in a look-up table generated by a focus calibration routine performed at the time of manufacturing of the camera system. The effect of ageing, however, is slow, irreversible, and cannot be forecasted in advance. Focus distance drift caused by ageing may be especially disruptive to device operation due to its unpredictability and the large magnitude of resulting defocus. To restore performance of a camera system with a tunable lens affected by ageing, the corresponding look-up table may be updated, and the updating process may be continuously performed thereafter to account for further degradation.

The look-up table may be updated in various ways depending on the operating parameters of the camera system. The most reliable way to update the look-up table is to repeat the focus calibration process. The calibration process may utilize the camera system to monitor targets at precisely-known distances and compare the current focus distance to one or more predetermined focus distance values contained in the look-up table. For each distance of a number of distances, for example, the camera system may record the tunable lens driving voltage that results in the best focus for a given focus distance. Because an accurate focusing operation is integral for device performance, the focus calibration process is typically performed by a skilled operator or technician to avoid damaging the camera system or included components. Conventional focus calibration processes also utilize a dedicated setup process that may require a user to, for example, unmount the camera system from its operating stand.

To summarize, open-loop camera systems are functionally impaired by tunable lens ageing drift. A typical way to restore such functionality to an open-loop camera system is to run frequent, extensive calibration processes at periodic intervals in conditions difficult to replicate in the field.

BRIEF SUMMARY

To overcome the shortcomings of current focus distance calibration processes, the systems, methods, devices, and principles described herein enable a camera system to perform a focus distance calibration process without requiring external setup or the intervention of an operator or technician. Utilizing the principles described herein, an automated process to routinely (e.g., periodically or aperiodically) calibrate the tunable lens of a camera system may be performed.

More specifically, an in-chamber device and method for calibrating a tunable-focus camera system may be used to restore the optical stability of a tunable lens and improve the performance of the camera system. In particular, one embodiment may include an optical chamber that includes a housing, a camera sensor, a camera receiving lens, and an illumination source. The housing may define an aperture, and the camera sensor may be disposed within the housing. The camera receiving lens may be disposed in the aperture of the housing and be configured to enable light external of the optical chamber to be focused onto the camera sensor. The illumination source may be configured to output an illumination signal that is incident the camera receiving lens along a first axis via the camera receiving lens. The illumination signal may be reflected from a reflective element as a reflected illumination signal back through a second axis via the camera receiving lens so as to enable the reflected illumination signal to be sensed.

Another embodiment relates to a system that may include a first housing, a window, an optical chamber, and electronics. The first housing may define a first aperture, and the window may be positioned at the first aperture to enable light to enter the window into the first housing. An optical chamber may be disposed within the first housing and include a second housing, a camera sensor, a camera receiving lens, and an illumination source. The second housing may define a second aperture, and the camera sensor may be disposed within the second housing. The camera receiving lens may be disposed within the aperture of the second housing and be configured to enable light external from the optical chamber that enters the camera receiving lens to be focused onto the camera sensor. The illumination source may be configured to output an illumination signal that is incident the camera receiving lens along a first axis via the camera receiving lens. The illumination signal may be reflected from a reflective element as a reflected illumination signal back through a second axis via the camera receiving lens so as to enable the reflected illumination signal to be sensed. The electronics may be in electrical communication with the camera sensor and configured to execute a focus calibration process by processing a sensed reflected illumination signal based on the reflected illumination signal. The electronics may be further configured to apply a control signal to cause at least one actuator to be adjusted in response to determining that the sensed reflected sensed illumination signal indicates that the camera receiving lens is out of focus to determine that the sensed reflected illumination signal indicates that the camera receiving lens is in focus.

Another embodiment relates to a method of calibrating a camera system. The method may include storing, in a non-transitory memory, a look-up table inclusive of a calibrated driving signal, calibrated focus distance, and calibrated sensed reflected signal associated with the calibrated focus distance. The method may include directing, from within the camera system, an illumination signal via a camera receiving lens towards outside the camera system to be reflected back through the camera receiving lens as a reflected illumination signal. The method may further include sensing the reflected illumination signal as a sensed reflected illumination signal and measuring the sensed reflected illumination signal as a measured reflected illumination signal. The method may include calculating a difference between the measured sensed reflected illumination signal and stored calibrated reflected illumination signal to generate a difference sensed reflected illumination signal. Further, the method may include determining a new driving signal based on the difference sensed reflected illumination signal and outputting the driving signal to cause at least one actuator to be adjusted. Directing, sensing, measuring, calculating, determining, and outputting may be repeated to determine that the difference sensed reflected illumination signal is within a predetermined range, and a final new driving signal may be stored.

BRIEF DESCRIPTION OF THE FIGURES

Illustrative embodiments of the present invention are described in detail below with reference to the attached drawing figures, which are incorporated by reference herein and wherein:

FIG. 12 is an illustration of an illustrative look-up table used in performing a self-calibration;

DETAILED DESCRIPTION

Figure 1:
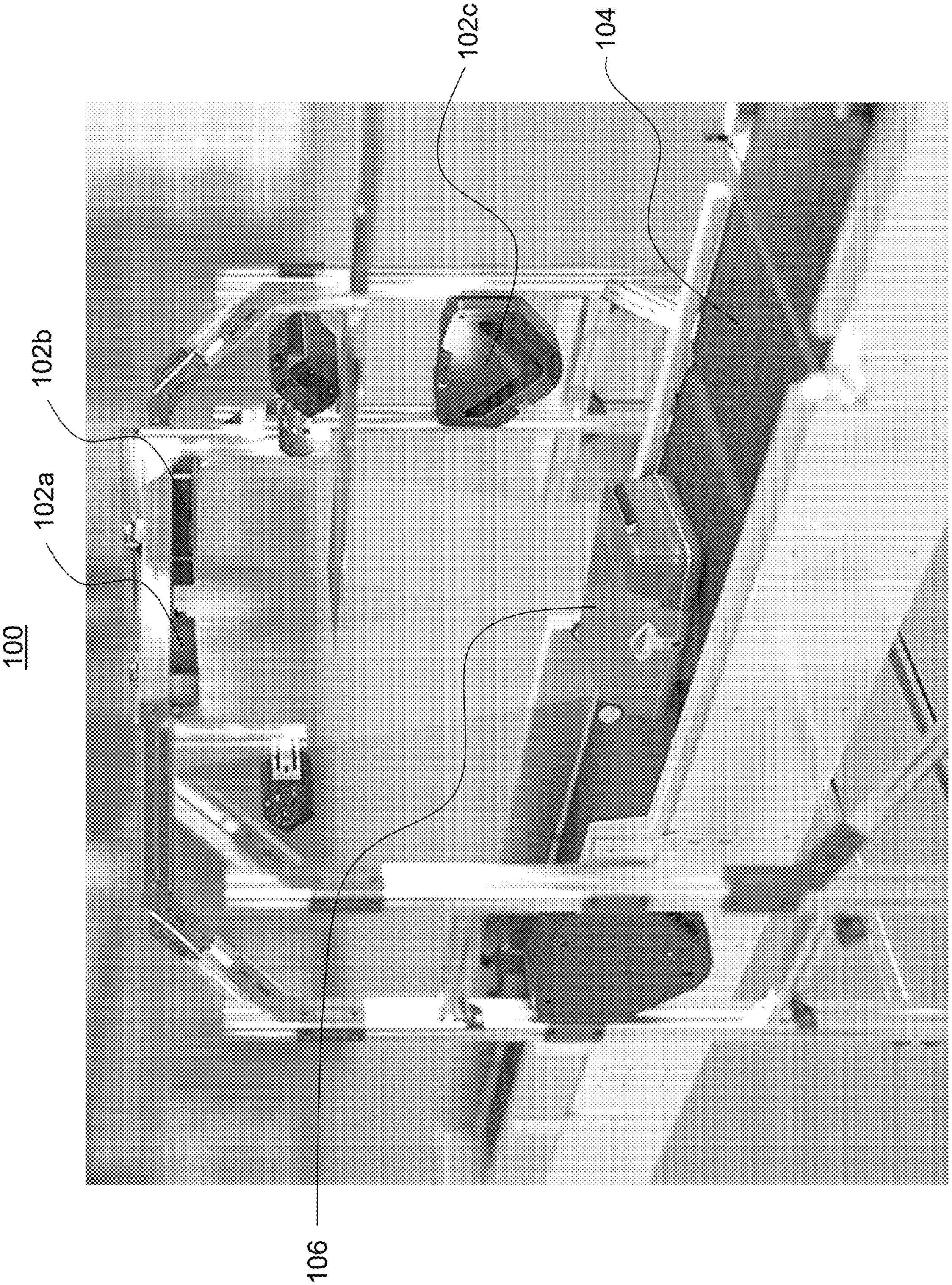
FIG. 1 is an illustration of an illustrative conveyor system with cameras and a conveyor belt, the cameras being configured to image objects being transported by the conveyor belt and being configured with a self-calibration tuning system as described herein.

Camera systems that utilize a tunable (e.g., focal length change and/or optical power or magnification using liquid or physical adjustability) lens are negatively affected by aging of the lens. As the lens ages, an ageing drift process progresses, and device performance varies unexpectedly and unpredictably. A focus calibration process may be performed to improve the optical performance of the lens. Existing calibration techniques of lenses utilize a dedicated external setup and involvement by a skilled technician, which reduces efficiency and increases associated costs. In accordance with the principles herein, a lens calibration process may be performed automatically utilizing a tunable focus lens such that an automatic focus process may be performed without an external setup.

When monitoring objects, camera systems that provide tunable focus (i.e., camera systems utilizing a tunable-focus lens or tunable lens) typically adjust their focus distance according to a distance of an object being monitored to maintain adequate image quality (focus level, contrast, etc.) for image analysis. These camera systems may be classified as either (i) "open-loop" systems or (ii) "closed-loop" systems. In open-loop systems, the camera is not aware of the object distance and adjusts the focus distance by means of an external input. Thus, if the focus distance of an open-loop camera system is set incorrectly, the performance of the camera system is negatively impacted. In closed-loop systems, the camera relies on continuous feedback regarding the object distance or imaging quality and, using an iterative or automatic process, adjusts focus distance of the camera system to the correct focus distance corresponding to the object being monitored.

A tunable focus system may be configured by using (i) a driving electrical signal to change the distance between the camera receiving lens and the camera sensor or (ii) a tunable lens (an electro-optical transducer that converts a driving signal (e.g., voltage) into optical power variation). The relationship between a driving electrical signal and focus distance may be contained in a look-up table that is generated by a focus calibration routine performed before regular device operation (e.g., during manufacturing of the camera system or tunable lens).

To overcome the shortcomings associated with tunable lens ageing drift and calibration processes, the present disclosure includes implementations of systems and methods that allow a focus calibration process to be performed on a camera system without the intervention of an operator and without any external setup. Utilizing the principles described herein, an automated process to routinely (e.g., periodically or aperiodically) calibrate the tunable lens of a camera system may be performed. The automatic calibration process may update a calibration look-up table stored by the camera system.

For example, an internal calibration system for automatically calibrating a tunable lens of a camera system is disclosed. The internal calibration system may include (i) an optical chamber including a receiving lens, (ii) a light source disposed within the optical chamber, (iii) an optical detector configured to collect the light generated by the light source, and (iv) a reflective element configured to reflect source rays that are output from the light source via the tunable lens so as to be incident on the optical detector via a "double-pass" through the receiving lens. Because the light collected by the optical detector is dependent on the focus calibration of the receiving lens, the camera system may perform a self-calibration (or automatic calibration).

More specifically, a camera system may include a camera or image sensor and a camera receiving lens. The camera sensor may be contained in an optical chamber that allows light to pass through only the camera receiving lens and prevents the camera sensor from being exposed to external light that has not first passed through the camera receiving lens. Rather than relying on external input to perform a focus calibration process, the optical chamber may include an illumination source (e.g., an LED) contained inside of the optical chamber itself, and the illumination source may pass through the camera receiving lens and be reflected by a reflective element as a reflected illumination source. In an embodiment, the reflected illumination source may pass through the camera receiving lens, thus creating a "double pass" system, and be imaged onto an optical detector that may also be contained within the optical chamber. In an embodiment, the reflective element may be disposed outside the optical chamber.

Because the components used for performing a focus calibration process may be contained within the optical chamber of the camera system, thus creating an "internal calibration system," no external setup may be utilized to perform a calibration. In an embodiment, the reflective element may be disposed within a camera housing in which the optical chamber is positioned. By placing the illumination source within the optical chamber and allowing an illumination signal output by the illumination source to pass through the camera receiving lens twice, rather than placing the source at predefined intervals external to the camera systems, the camera system may also maintain a compact physical footprint and avoid interference with corresponding external mechanics. Further, the camera system may be configured to perform the focus calibration sequence automatically to correct tunable lens ageing drift, which may allow the camera system to resume working under optimal conditions without a skilled operator having to perform a calibration process.

With regard to FIG. 1, an illustration of an illustrative conveyor system 100 with cameras 102*a*-102*c* (collectively 102) and a conveyor belt 104, the cameras 102 being configured to image object(s) 106 being transported by the conveyor belt 104 and being configured with a self-calibration tuning system as described herein is shown. One or more of the cameras 102 may be self-calibrating, for example. The conveyor belt 104 may include one or more object(s) 106 located on the conveyor, and the cameras 102 may be configured to monitor the object(s) 106 located on the conveyor by, for example, capturing an electronic image (e.g., photograph) of the objects(s) 106.

Figure 2:
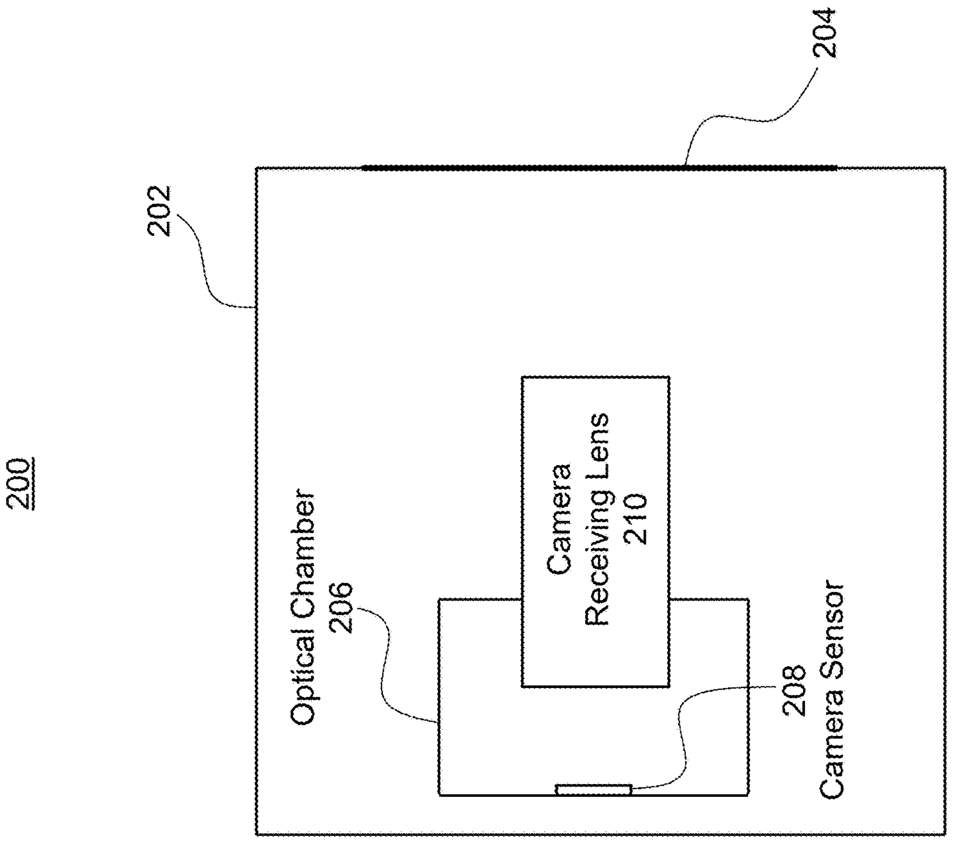
FIG. 2 is a block diagram of an illustrative camera system including an optical chamber with a receiving lens that may be a tunable lens.

With regard to FIG. 2, a block diagram of an illustrative camera system 200 including an optical chamber 206 with a receiving lens 210 that may be a tunable lens is shown. The camera system 200 may include a housing (or protective case) 202 that protects the camera system 200 from an external environment, and the housing 202 may include an external window (or exit window) 204 configured to allow an illumination signal (or light, light rays, etc.) to pass through the external window 204. The camera system 200 may also include an optical chamber 206. The optical chamber 206 may be configured to prevent a camera sensor (or image sensor) 208 contained therein from being exposed to external light and be configured to allow light to only pass through a camera receiving lens or camera lens 210. The camera receiving lens 210 may be a tunable-focus lens (or tunable lens) or any other camera lens configured to allow the focus distance of the camera receiving lens to be adjusted.

Figure 3:
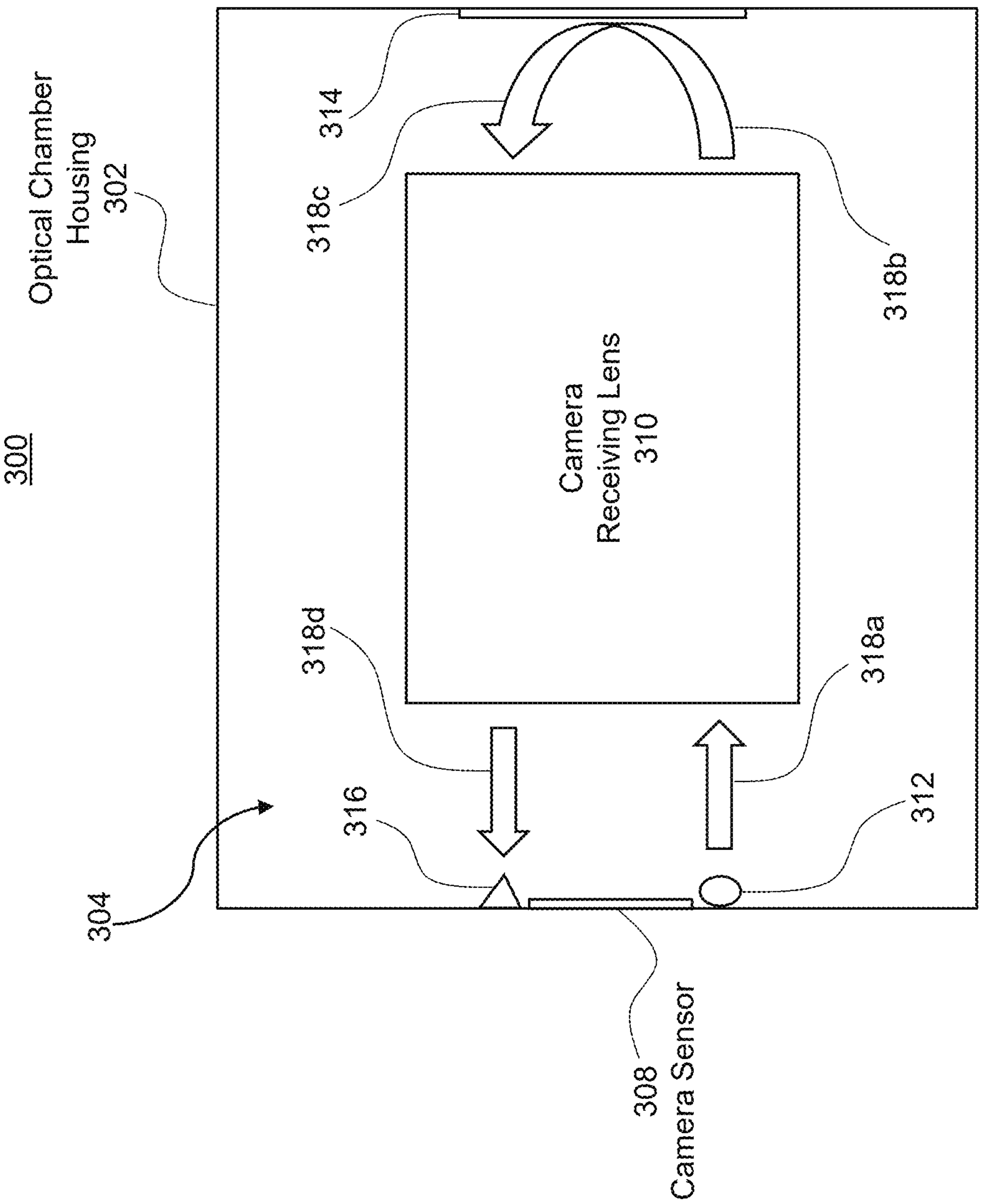
FIG. 3 is a block diagram of an illustrative optical chamber with an optical chamber housing within which optical components are positioned to enable self-calibration.

With regard to FIG. 3, a block diagram of an illustrative optical chamber 300 with an optical chamber housing 302 within which optical components 304 are positioned to enable self-calibration is shown. The optical components 304 may include a camera sensor 308, camera receiving lens 310, illumination source 312, reflective element 314, and optical detector 316. Illumination signals 318*a*-318*d* (collectively 318) may be transmitted respectively (i) from the illumination source 312, (ii) pass through the camera receiving lens 310, (iii) reflect by the reflective element 314, and (iv) pass back through the camera receiving lens 310 and illuminate the optical detector 316 to provide for self-calibration.

The illumination source 312 may be implemented as a light-emitting diode (LED), as an optical fiber or "light pipe" that is fed by an illumination source, or as any other device, system, or apparatus capable of generating an illumination signal that may be received by the camera sensor 308 and/or by the optical detector 316, as further described herein. Alternative configurations are possible.

The optical detectors 316 may be implemented as a single-pixel photodiode, as a multi-pixel photodiode, or as any other device, system, or apparatus capable of sensing an illumination signal generated by illumination source(s) 312. Although illumination signal 318*a* and reflected illumination signal 318*d* are shown to be parallel with one another, it should be understood that non-parallel light rays are possible (see, for examples, FIGS. 7A and 7B).

Figure 4:
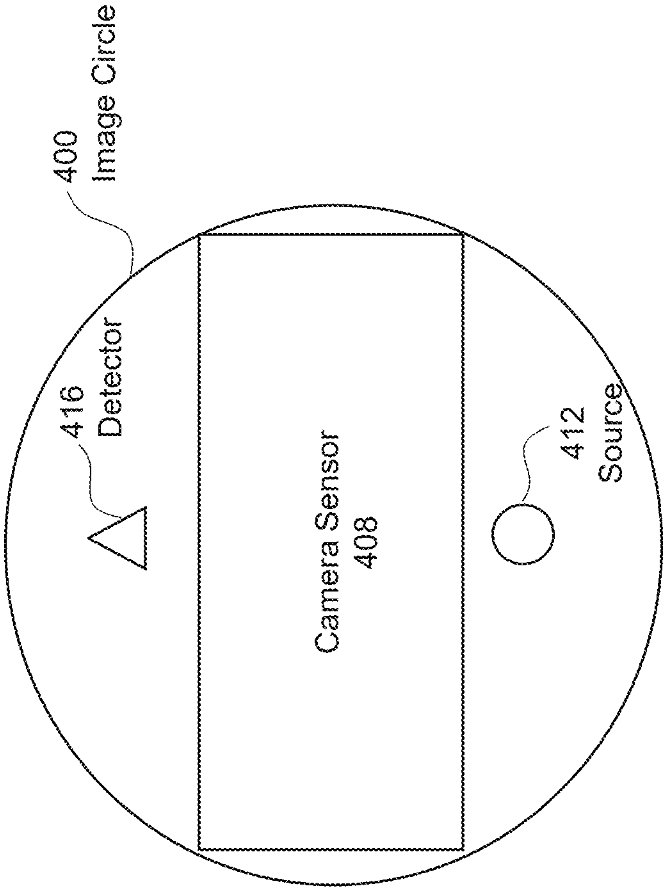
FIG. 4 is a block diagram of an illustrative camera image circle that includes a camera sensor, an illumination source, and an optical detector for supporting self-calibration of a tunable lens.

With regard to FIG. 4, a block diagram of an illustrative camera image circle 400 that includes a camera sensor 408, an illumination source 412, and an optical detector 416 for supporting self-calibration of a tunable lens is shown. The illumination source 412 and optical detector 416 may be located near the camera sensor 408 and within the camera image circle 400. As shown, utilizing a camera sensor 408 that is rectangular in shape allows for additional space within the camera image circle 400 to include the illumination source 412 and/or the optical detector 416 within the camera image circle 400. Additional illumination sources and detectors may be positioned in the available area, as provided in FIGS. 5A and 5B.

Figure 5B:
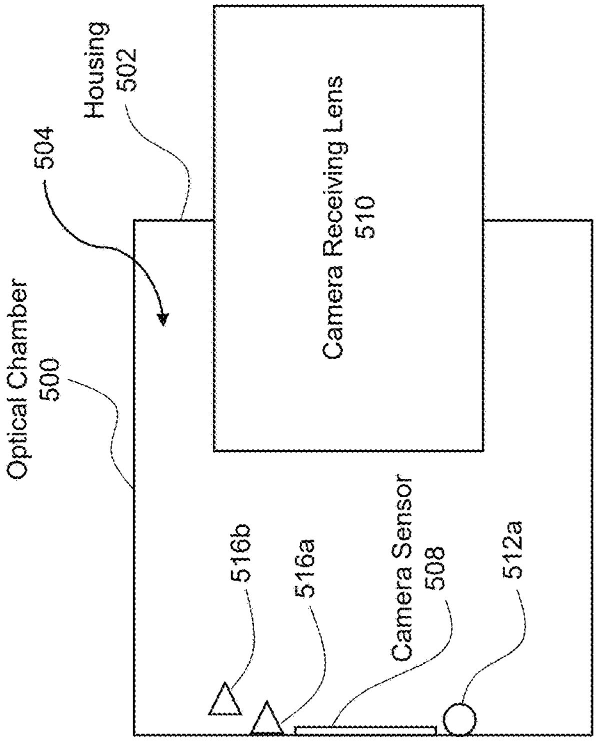
FIGS. 5A and 5B are block diagrams of illustrative optical chambers including a housing with alternative configurations of optical components for performing self-calibration of a tunable lens.
Figure 5A:
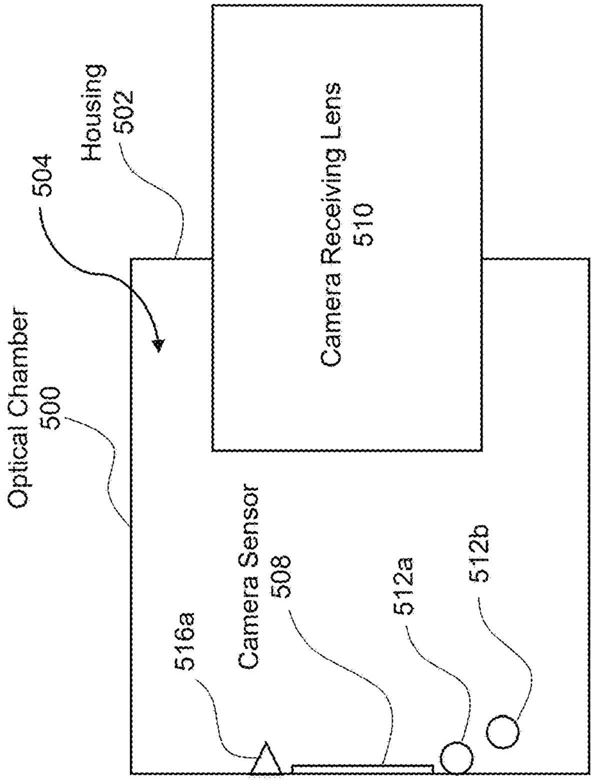

With regard to FIGS. 5A and 5B, block diagrams of illustrative optical chambers 500*a* and 500*b* including housing 502 with alternative configurations of optical components 504 for performing self-calibration of a tunable lens are shown. The optical components 504 may include a camera sensor 508, camera receiving lens 510, and (i) multiple illumination sources 512*a* and 512*b* (collectively 512) and a single optical detector 516*a* (FIG. 5A), or (ii) a single illumination source 512*a* and multiple optical detectors 516*a* and 516*b* (FIG. 5B) (collectively 516) for supporting self-calibration of a tunable lens.

As shown in FIG. 5A, the illumination sources 512 may be located beside and coplanar with and non-coplanar with the camera sensor 508 and within the camera image circle (shown on FIG. 4 as 400) of the camera receiving lens 510. Illumination signals generated by the illumination sources 512 may be used to simulate objects at different distances so as to enable self-calibration of the tunable lens at different distances from the camera receiving lens 510.

Moreover, by using multiple illumination sources 512, additional focus condition information related to the focus condition of the camera receiving lens 510 may be accessed and utilized during a focus calibration process (or focus calibration, internal calibration process, self-calibration process, etc.) of a tunable lens of the camera. The additional focus condition information can be used to make the focus calibration process faster and more robust. For example, if the illumination sources 512*a* and 512*b*, which may be at different heights, have a different distance in at least one of the X, Y, and Z axes relative to the camera receiving lens 510, each of the illumination sources 512 may provide focus condition information when illumination signals are respectively received by the optical detector 516 to be used by a calibration system or camera system. As a result, the system performing a focus calibration process may access and utilize to two sets of focus condition information corresponding to each respective position of the illumination sources 512 rather than a single illumination source. In an alternative embodiment, multiple optical detectors 516*a* and 516*b* that are oriented at different heights may be included (see FIG. 5B, for example) such that both illumination sources 512*a* and 512*b* and optical detectors 516*a* and 516*b* have different heights and, thus, offer flexibility for capturing images.

According to another example, the illumination sources 512 may be configured to emit illumination signals over different wavelengths, which may provide different focus condition information for calibration purposes. As a result, the camera system performing a focus calibration process may utilize different illumination signals (i.e., corresponding to each respective wavelength of each of the illumination sources 512) rather than a single illumination signal generated by a single illumination source. It should be understood that additional and/or alternative illumination signals from the same or different illumination sources may be utilized for these purposes.

As shown in FIG. 5B, the optical detectors 516*a* and 516*b* (collectively 516) may be located beside the camera sensor 508 and within the camera image circle (shown on FIG. 4 as 400) of the camera receiving lens 510. The optical detectors 516 may be configured to detect one or more illumination signals generated by the illumination source 512 that enters and is reflected back through the camera receiving lens 510. For example, the optical detectors 516 may generate value(s) corresponding to each illumination signal that may represent the magnitude or the spatial shape of optical flux received by each of the optical detectors 516.

By using multiple optical detectors 516, additional focus condition information related to calibration of a tunable lens (e.g., the camera receiving lens 510) may be accessed and utilized during a focus calibration process, which may make the process faster and more robust. For example, if the optical detector 516*a* has a different height or distance than the optical detector 516*b* relative to the camera receiving lens 510, each of the optical detectors 516 may be configured to model sensing an object at a certain focus distance in response to receiving an illumination signal from the illumination source 512. As a result, the camera system with a calibration system performing a focus calibration process may access and utilize multiple sets of focus condition information corresponding to each of the optical detectors 516 rather than a single set of focus condition information that may be received by a single optical detector 516*a*, for example.

In another example in which the optical detectors 516 may be configured to receive illumination signals corresponding to different wavelengths, each of the optical detectors 516 may be configured to model an object at a certain distance using different colors (e.g., one of the optical detectors 516 may be configured to sense the color red, blue, etc.). As a result, the camera system with a self-calibration system performing a focus calibration process may again access multiple sets of focus condition information corresponding to each respective wavelength from illumination source 512 received by the optical detectors 516, rather than a single set of focus information received by a single optical detector 516*a*, for example. Moreover, the use of optical detectors 516 that measure different colors may result in more precise calibration. In an embodiment, signals output by the detectors 516 may be combined for use in performing the calibration. It should be understood that additional and/or alternative values corresponding to illumination signals received by each of the optical detectors 516 and related to the focus condition of the camera receiving lens 510 may be utilized for these purposes.

As an example of the principles described above, a self-calibrating camera system may utilize an illumination source 512 that is a "wide spectrum source" (e.g., a source that includes different wavelengths of light, such as a white or "natural" light source) and multiple optical detectors 516 that include wavelength selective filters. Using this approach, each of the optical detectors 516 may provide focus information related to a camera system and camera receiving lens 510 at a specific wavelength corresponding to the wavelength selective filter included each of the respective optical detectors 516.

Figure 6B:
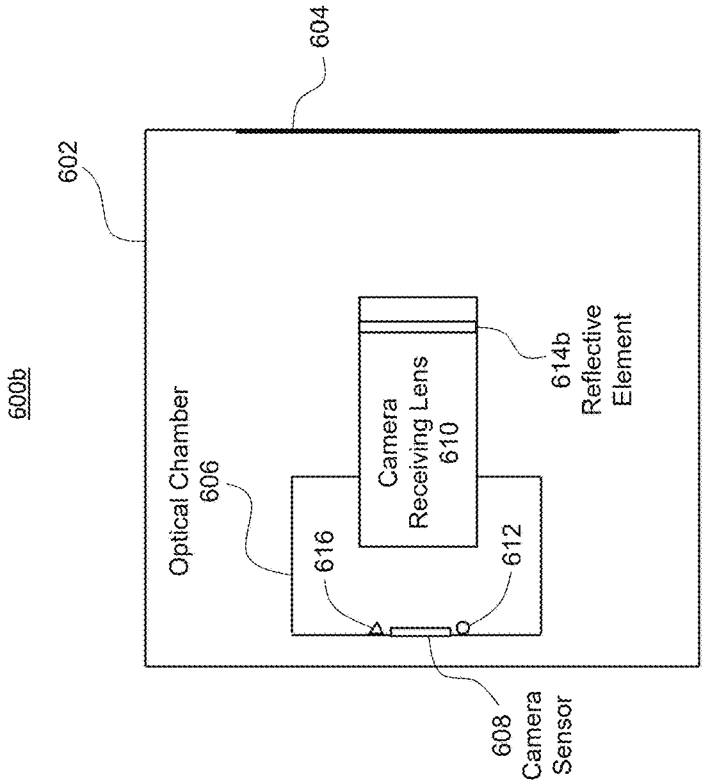
FIGS. 6A and 6B are block diagrams of illustrative camera systems configured to support self-calibration of a tunable lens.
Figure 6A:
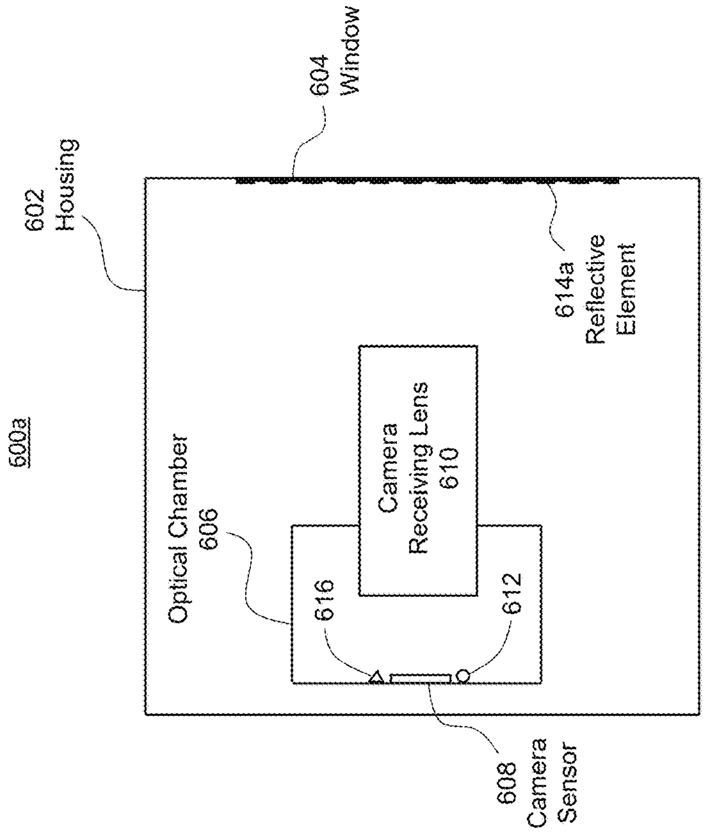

With regard to FIGS. 6A and 6B, block diagrams of illustrative camera systems 600*a* and 600*b* (collectively 600) configured to support self-calibration of a tunable lens are shown. The camera systems 600 may include a housing 602, an external window 604, and an optical chamber 606. The optical chamber 606 may include a camera sensor 608, camera receiving lens 610, illumination sources(s) 612, and optical detector(s) 616. The camera systems 600 may further include reflective elements 614*a* and 614*b* (collectively 614). As shown in FIG. 6A, the reflective element 614*a* may be located on (or integrated within) the external window 604. As shown in FIG. 6B, the reflective element 614*b* may be integrated within the camera receiving lens 610. The reflective elements 614 may be flat or other shaped elements and positioned within the camera receiving lens 610 or be located on and integrated with the external window 604 of the camera systems 600 so as to reflect an illumination signal output by the illumination source(s) 612. That is, the reflective elements 614 may be positioned and oriented to cause the illumination signal(s) generated by the illumination source(s) 612 that pass through the camera receiving lens 610 to be reflected back through the camera receiving lens 610 so as to be incident on the optical detector(s) 616. It should be understood that a camera system including (i) multiple illumination sources 512 and a single optical detector 516*a* (as shown in FIG. 5A), (ii) a single illumination source 512*a* and multiple optical detectors 516 (as shown in FIG. 5B), or (iii) any combination thereof may also be utilized for these purposes.

The reflective elements 614 may also be transmissive (e.g., wavelength selective) to allow normal operation of the camera system with the reflective elements 614 (*i*) located on (or integrated within) the external window 604 (as shown in FIG. 6A), or (ii) located on or integrated within the camera receiving lens 610 (as shown in FIG. 6B). The reflective element 614 may include, for example, a wavelength selective mirror or reflector allowing illumination signals to be transmitted over an operating wavelength range of the camera system(s) 600 (e.g., the visible spectrum range) and creating maximum reflection at an operating wavelength of the camera system or a calibration system (e.g., infrared spectrum range).

In another implementation, the reflective element 614 may be a non-wavelength selective element. Small reflectivity of uncoated glass or plastic surfaces (approximately 4%), for example, may cause a sufficient amount of light to be reflected to enable the calibration process to be performed without interrupting normal operation of the camera system, providing that the illumination source 612 is sufficiently bright.

Figure 7B:
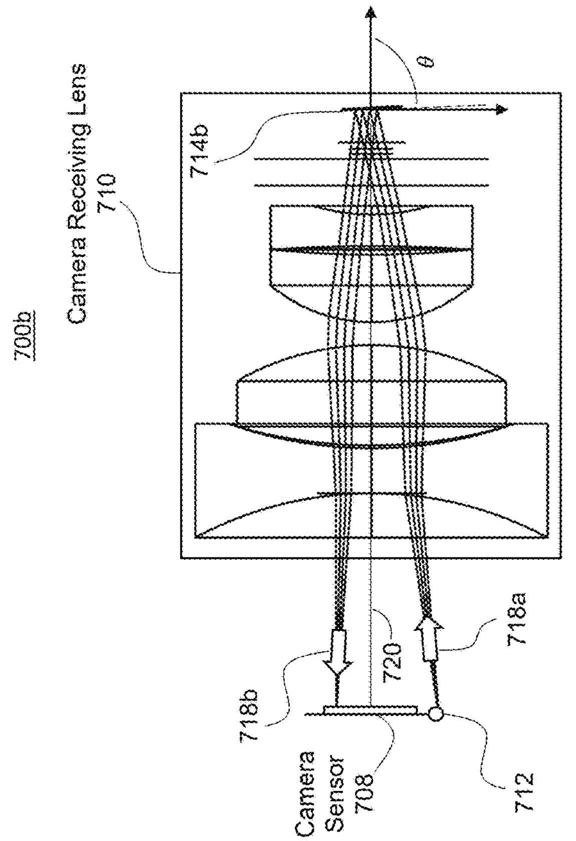
FIGS. 7A and 7B are block diagrams of illustrative camera systems configured to enable self-calibration of a tunable lens.
Figure 7A:
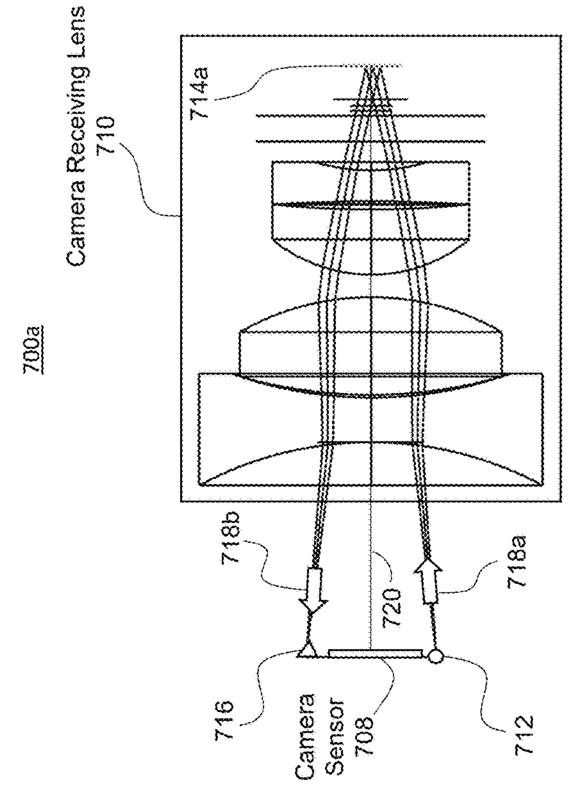

With regard to FIGS. 7A and 7B, block diagrams of illustrative camera systems 700*a* and 700*b* (collectively 700) configured to enable self-calibration of a tunable lens is shown. The camera systems 700 may include a camera sensor 708 in optical alignment with a camera receiving lens 710. The camera systems 700 may simply be optical chambers that include the optical components shown (an optical chamber housing is not shown). An illumination source 712, reflective elements 714*a* and 714*b* (collectively 714), and optical detector 716 may also be included. In operation, ray traces resulting from the illumination source 712 producing illumination signals 718*a* that reflect from the reflective element 714*a* to produce reflected illumination signals 718*b* on opposite sides of an optical axis 720. In FIG. 7B, the reflective element 714*b* is tilted such that the reflected illumination signal 718*b* is incident the camera sensor 708 as opposed to an optical detector. In an embodiment, the camera sensor 708 may be oriented substantially orthogonally (i.e., at a 90-degree angle) with respect to the optical axis 720 to allow the center point of the front face of the camera sensor 708 to align with the optical axis 720. The optical axis 720 is a line that is a nominal axis of rotational symmetry of the lens elements of the camera receiving lens 710. The camera receiving lens 710 may also be included in camera system(s) 700 and be oriented to allow the center axis of the camera receiving lens 710 to define or align with the optical axis 720. The illumination source 712 may generate an illumination signal 718*a* that may pass through the camera receiving lens 710. The illumination signal 718*a* may then reflect from the reflective elements 714*a* and 714*b*, respectively, and may again pass through the camera receiving lens 710 as the reflected illumination signal 718*b*.

The orientation of the reflective elements 714 relative to the optical axis 720 of the camera system(s) 700 may depend on (i) the vignetting properties of the camera receiving lens 710; (ii) whether a camera sensor 708 (instead of an optical detector 716) is used for receiving the reflected illumination signal 718*b*; (iii) the numbers of camera sensor(s) 708, illumination source(s) 712, and optical detector(s) 716 included in the camera system 700; and (iv) the relative orientation of the camera sensor(s) 708, illumination source(s) 712, and optical detector(s) 716 with respect to the camera receiving lens 710 and the optical axis 720.

As shown in FIG. 7A, the camera system 700*a* may include the optical detector 716 configured to receive the reflected illumination signal 718*b*. The illumination source 712 and optical detector 716 may be oriented symmetrically with respect to the optical axis 720 such that a first distance between the illumination source 712 and the optical axis 720 is substantially equivalent to a second distance between the optical detector 716 and the optical axis 720. In this configuration, the reflective element 714*a* may be oriented substantially orthogonally (i.e., at a 90-degree angle within a certain tolerance, such as 2% or 3%) with respect to the optical axis 720 to cause the illumination signal 718*a* to be reflected identically (i.e., as a mirror image) across the optical axis 720 as the reflected illumination signal 718*b*. Accordingly, the illumination signals 718*a*-718*b* may travel identical distances relative to the optical axis 720, and the signal originating at the illumination source 712 may be received by the optical detector 716.

As shown in FIG. 7B, the camera system 700*a* may utilize the included camera sensor 708 to receive the reflected illumination signal 718*b* instead of including a dedicated optical detector. In this embodiment, a center point of the front face of the camera sensor 708 may be aligned such that half the length of the camera sensor 708 may be disposed above and below the optical axis 720. Alternative configurations, such as off-center alignment or alignment along a different axis (e.g., perpendicular axis) of the camera sensor 708 are possible, provided that the illumination signal originating from the illumination source 712 reflects back to the camera sensor 708 (or the optical detector 716). The illumination source 712 may be located at a distance from the optical axis 720 that may be greater than half the length of the camera sensor 708. In this configuration, the reflective element 714*b* may be tilted at an angle θ relative to the optical axis 720 that may cause the illumination signal 718*a* to be reflected as a reflected illumination signal 718*b* at an angle incident to the camera sensor 708. As shown, tilting the reflective element 714 slightly (e.g., in a manner to cause minimal effect on normal camera system operation, such as between about 1° and about 10°) towards the illumination source 712 may cause the reflected illumination signal 718*b* to travel a shorter distance along a direction parallel to the camera sensor 708 (or substantially orthogonal to the optical axis 720) as compared to the distance traveled by the illumination signal 718*a*. For example, the reflective element 714*b* may be tilted such that the reflected illumination signal 718*b* may travel a distance that is shorter than half the length of the camera sensor 708 and may be received by the camera sensor 708, as shown.

If the optical detector 716 is used to sense the reflected illumination signal 718*b*, a brightness or other optical characteristic may be utilized to determine whether a tunable lens, such as the camera receiving lens 710, is properly calibrated (e.g., if the brightness does not match an original calibration brightness level within a range, then the tunable lens is not properly calibrated). If the camera sensor 708 is used, then a spot that has a certain size, defined edge, blur, average brightness, or otherwise may be used to determine whether a tunable lens is properly focused. For either configuration of using the optical detector 716 or camera sensor 708, a voltage level being used to focus the tunable lens may be stored as a calibration value of the camera system.

Figure 8A:
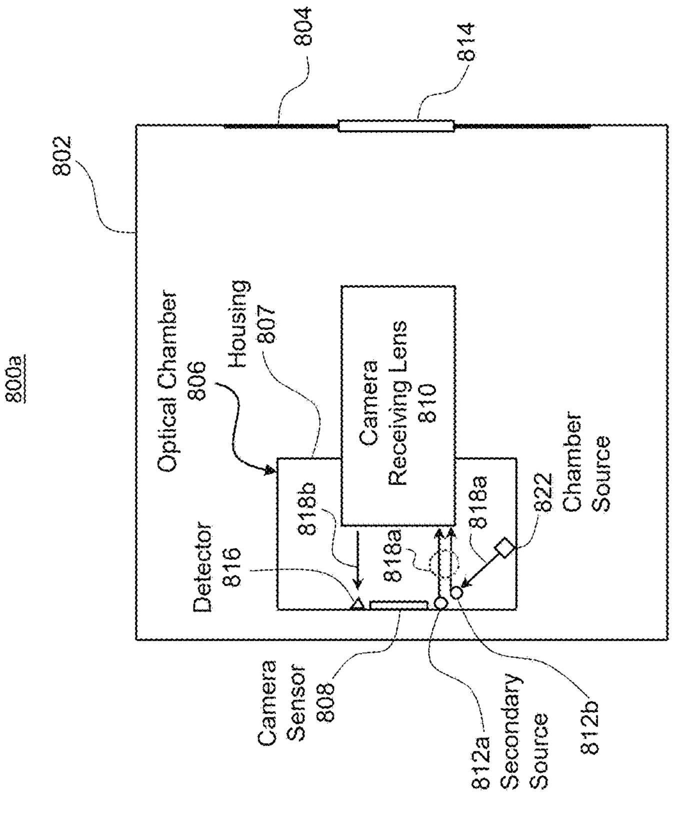
FIGS. 8A and 8B are block diagrams of illustrative camera systems with a housing that defines an external window, and optical chamber used to perform self-calibration of a tunable lens.
Figure 8B:
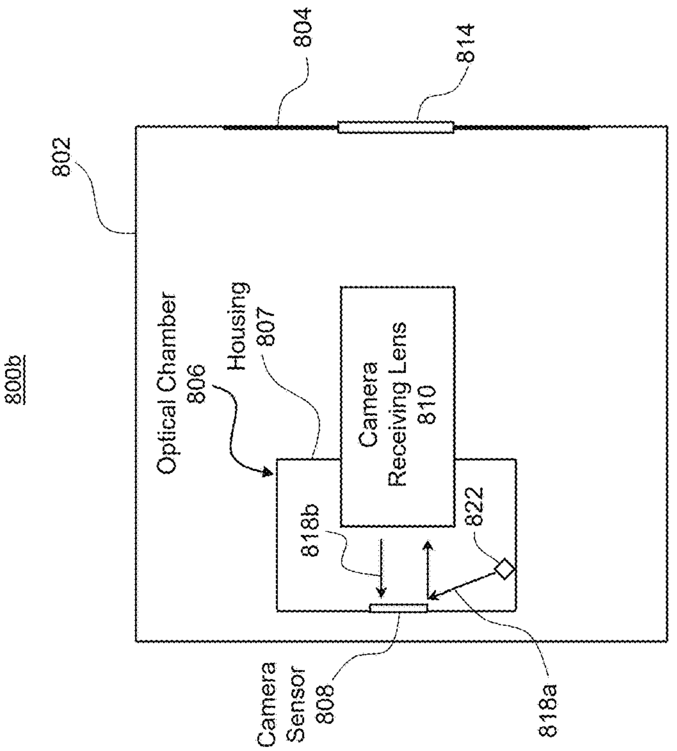

With regard to FIGS. 8A and 8B, block diagrams of illustrative camera systems 800*a* and 800*b* (collectively 800) with a housing 802 that defines an external window 804, and optical chamber 806 used to perform self-calibration of a tunable lens of the camera systems 800 are shown. As previously described, the optical chamber 806 may include a camera receiving lens 810 that is optically aligned with multiple secondary illumination sources 812*a* and 812*b* (collectively 812), a reflective element 814, and an optical detector 816. The secondary illumination sources 812 may output illumination signals 818 or a chamber source 822 may output illumination signal 818 that is aimed at the secondary illumination sources 812 to be reflected or redirected into the camera receiving lens 810 to be used for performing self-calibration of a tunable lens.

Turning to FIG. 8A, the chamber source 822 may be placed outside of the image circle of the camera receiving lens 810 and within the optical chamber 806. The chamber source 822 may produce an illumination signal 818*a* that may be rediffused by one or more of the secondary source(s) 812*a*-812*b* such that the chamber source 822 is acting as the illumination source 712 as shown in FIGS. 7A-7B. The illumination signal 818*a* may have one or more optical characteristics (e.g., brightness, blur) after being generated by the chamber source 822, and the optical characteristic(s) may not change as a result of the illumination signal 818*a* being rediffused by the secondary source(s) 812*a*-812*b*. The illumination signal 818*a* generated by the chamber source 822 and rediffused by the secondary source(s) 812*a*-812*b* may pass through the camera receiving lens 810 and be received by the optical detector 816 as the reflected illumination signal 818*b* and used for performing a self-calibration, as described regarding FIG. 7A.

Turning to FIG. 8B, the camera system 800*b* may include the chamber source 822 (without any secondary sources 812*a*-812*b* as shown in FIG. 8A) and include the camera sensor 808 to receive the reflected illumination signal 818*b* (as described regarding FIG. 7B). In particular, the camera sensor 808 may rediffuse (or scatter) the illumination signal 818*a* generated by the chamber source 822 in a manner similar to the secondary source(s) 812*a*-812*b* (as described regarding FIG. 8A). The illumination signal 818*a* may have one or more optical characteristics after being generated by the chamber source 822, and the optical characteristic(s) may not change as a result of the illumination signal 818*a* being rediffused by the camera sensor 808. The illumination signal 818*a* generated by the chamber source 822 and rediffused by the camera sensor 808 may pass through the camera receiving lens 810 and be received by the camera sensor 808 as the reflected illumination signal 818*b* and used for performing a self-calibration, as previously described. Acting as both the source and as the detecting element, the camera sensor 808 may "see" an image of itself.

The optical chamber 806 may be configured to minimize the stray light (or stray illumination signals) generated by the illumination source(s) 812 (e.g., by the secondary source(s) 812*a*-812*b* and/or by the chamber source 822). For example, the interior walls of the optical chamber 806 may be configured to maximize absorption of stray light by having a matte black interior wall color and finish. As another example, the dimensions and/or the orientations of the optical chamber 806 and optical chamber walls included therein may be tailored to maximize absorption of stray light. Further, the lens surfaces of the elements (e.g., the camera receiving lens 810) included in the camera system 800 may be configured to reduce reflection that may impair a focus-calibration process. It should be understood that such configurations of the optical chamber 806 and of the lens surfaces of elements included in the camera system 800 may be implemented regardless of the number included sources, secondary sources, chamber sources, detectors, etc. in the camera system 800. Further, such configurations are not limited to the illustrative examples disclosed above. Both the optical chamber 806 and the lens surfaces of included elements may be configured using various combinations of orientations, dimensions, finishes, materials, colors, etc. to minimize the stray light within the optical chamber 806.

Figure 9:
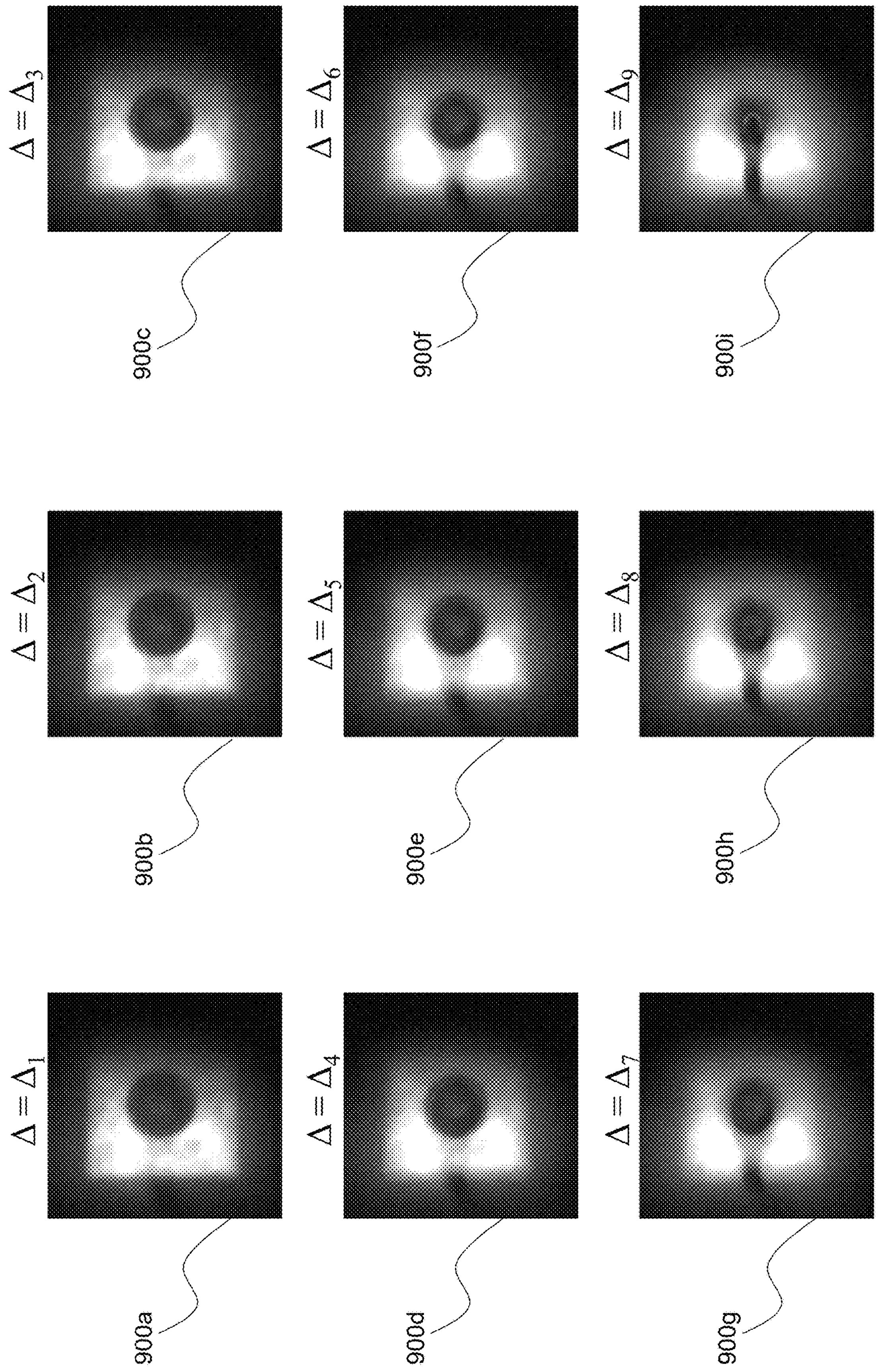
FIG. 9 is an illustration of illustrative images of an illumination source captured by the camera system in FIG. 7B at various focus conditions in performing a self-calibration.

With regard to FIG. 9, an illustration of illustrative images 900*a*-900*i* (collectively 900) of an illumination source captured by the camera system in FIG. 7B for different values of the tunable actuator signal (Δ) in performing a self-calibration is shown. As shown, the images 900 may become progressively more blurred as the corresponding tunable actuator signal (Δ) varies from $\Delta_1$ to $\Delta_9$. For example, the image 900*i*, as shown and captured at $\Delta=\Delta_9$, is more blurred than the image 900*a*, as shown and captured at $\Delta=\Delta_1$. Each of the images 900 and corresponding focus condition information (e.g., level of blur) captured at a given tunable actuator signal (4) may be compared to a pre-defined signal captured during a prior focus calibration process also containing focus condition information. For example, the level of blur of image 900*a* corresponding to a signal $\Delta=\Delta_1$ may be compared to a pre-defined level of blur captured during a previous focus calibration process and corresponding to a signal $\Delta=\Delta_1$. This process may be repeated for images 900*b*-900*i* such that a variety of focus condition information may be acquired and used for performing a self-calibration. Because the level of image blur depends on the focus condition of the corresponding receiving lens, the images 900 may be used to adjust the focus condition of the receiving lens to account for tunable lens ageing drift that may have occurred. The self-calibration (or focus calibration) process is described in greater detail below and in discussions regarding FIGS. 10-14.

According to an example, a focus calibration process may be performed by actuating a control signal of a tunable lens. The focus distance of the tunable lens may be actuated by, for example, adjusting the control signal of a stepper motor that actuates a back focal distance of the tunable lens or by adjusting the control signal of a deformable lens element within the objective lens such that the optical power of the lens changes. The camera system performing the focus calibration process may analyze a signal corresponding to the focus distance of the tunable lens in relation to a signal generated by the detecting element. If the detecting element is a photodiode, the amount of current received by the optical detector implementing the photodiode from a calibration source may be monitored. If the detecting element is the camera sensor, the amount of blur in the image corresponding to the calibration source may be evaluated (e.g., by using image analysis). If the calibration source or the detecting element provide focus condition information over different planes or wavelengths (as described with regard to FIGS. 5A and 5B), the calibration process may be faster and more robust. Multiple focus calibration processes may be performed using multiple calibration conditions, which may provide more accurate results in certain camera systems (e.g., those in which the response of the tunable focus system is not a linear function).

Figure 10:
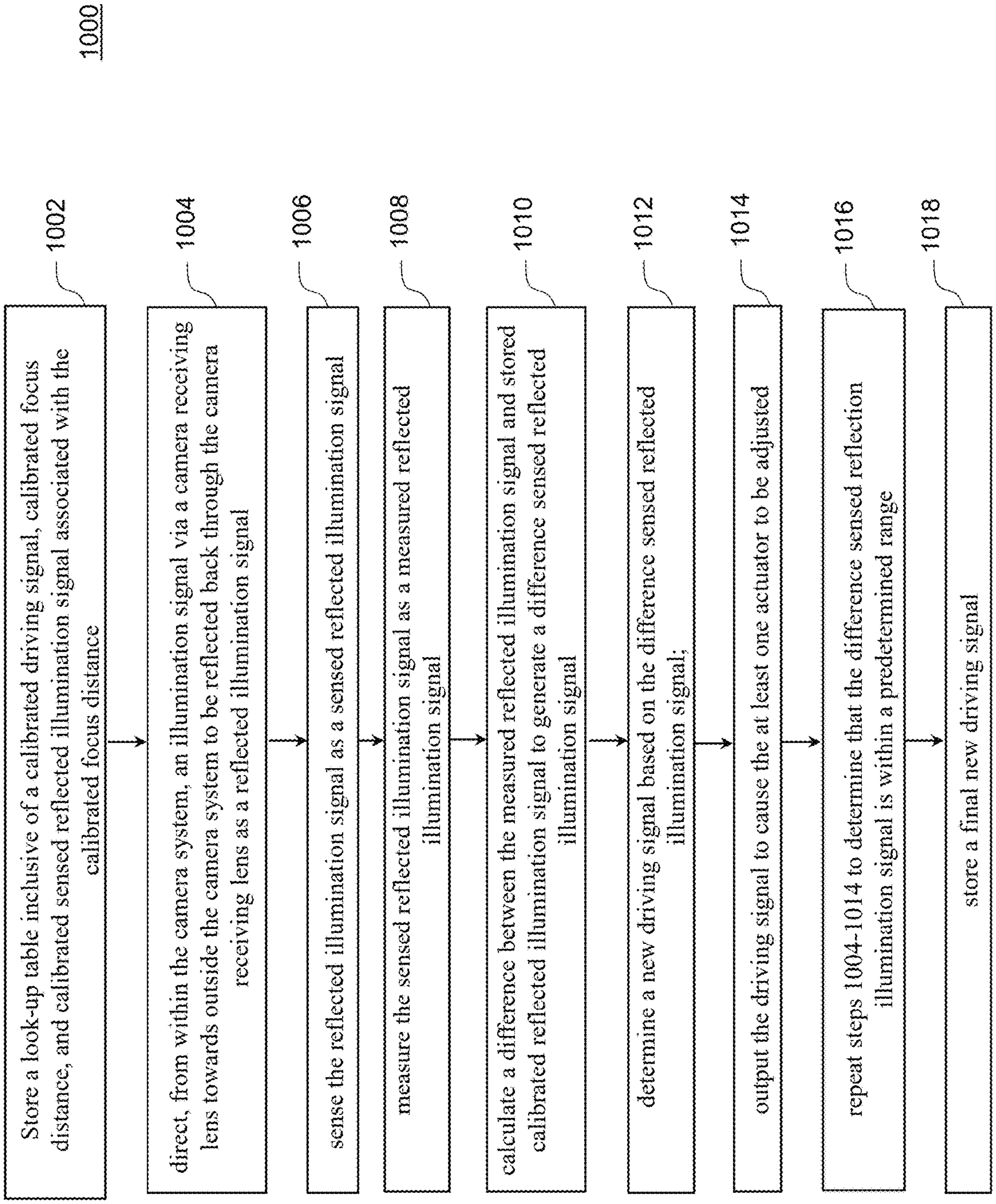
FIG. 10 is an illustration of an illustrative process for calibrating a camera system.

With regard to FIG. 10, an illustration of an illustrative process 1000 for calibrating a camera system is shown. The process 1000 may start at step 1002, where a look-up table inclusive of information used in performing a self-calibration may be stored. The look-up table may include, for example, calibrated driving signal(s), calibrated focus distance(s), and calibrated sensed reflected signal(s) associated with the calibrated focus distance of a camera receiving lens (or tunable lens) included in the camera system.

At step 1004, an illumination signal may be directed from within the camera system via a camera receiving lens towards outside the camera system to be reflected back through the camera receiving lens as a reflected illumination signal. The reflected illumination signal may be sensed as a sensed reflected illumination signal at step 1006, and at step 1008, the sensed reflected illumination signal may be measured as a measured reflected illumination signal. For example, the measured reflected illumination signal may include a level of blur in an image captured by a camera sensor, a voltage output by an optical detector, such as a photodiode, etc.

At step 1010, a difference between the measured reflected illumination signal and stored calibrated reflected illumination signal may be calculated to generate a difference sensed reflected illumination signal. At step 1012, a determination may be made as to a new driving signal based on the difference sensed reflected illumination signal. At step 1014, the new driving signal may be output to cause at least one actuator to be adjusted. The process 1000 may also include repeating the steps 1004-1014 in step 1016 to determine that the difference sensed reflected illumination signal is within a predetermined range. Once calibrated, a final new driving signal may be stored within the look-up table at step 1018.

Figure 11:
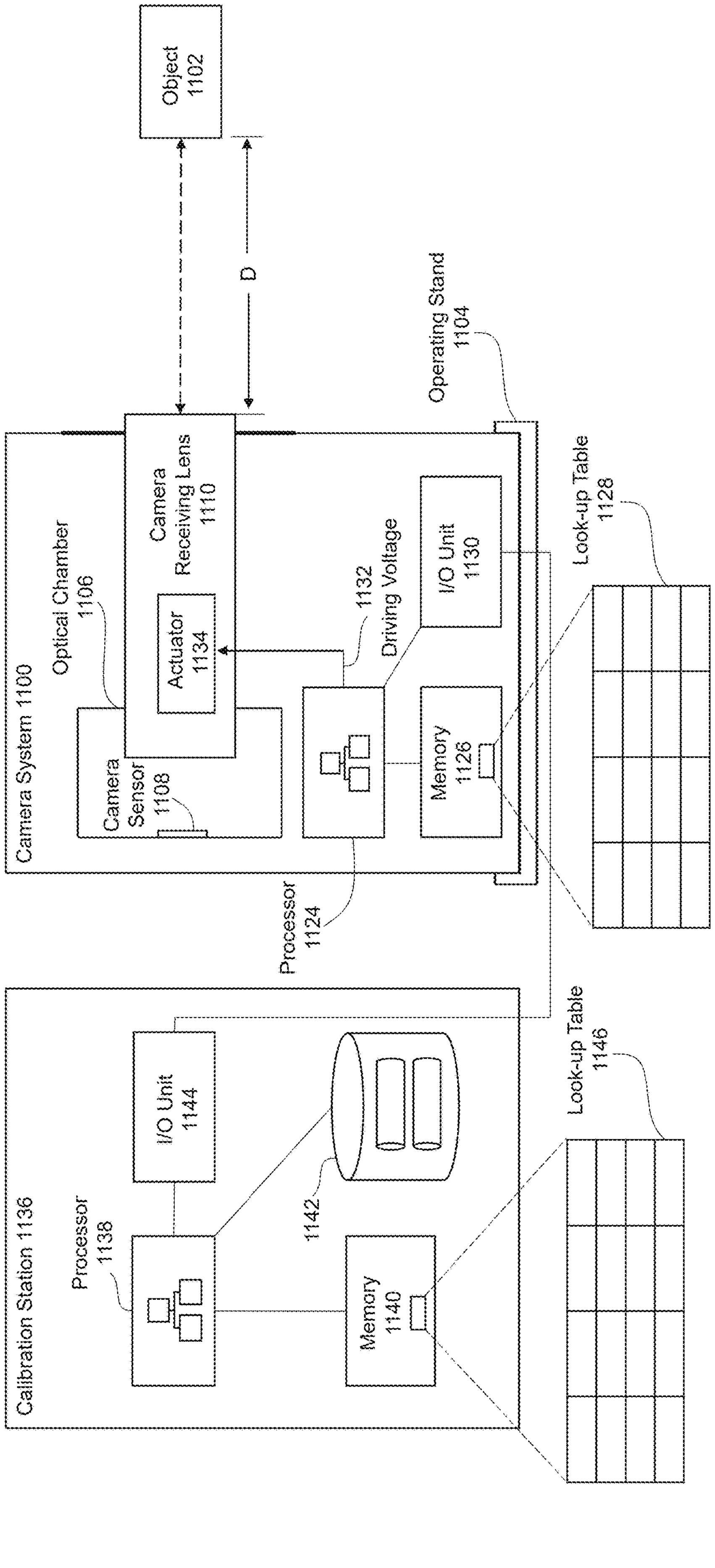
FIG. 11 is a block diagram of an illustrative camera system and calibration station.

With regard to FIG. 11, a block diagram of an illustrative camera system 1100 and calibration station 1136 is shown. The camera system 1100 being calibrated may include one or more processors 1124, and the calibration station 1136 may include one or more processors 1138. The processors 1124 and 1138 may be any processor, but may also be analog. The processors 1124 may be configured to transmit a driving voltage signal 1132 to a tunable actuator 1134 to adjust a camera receiving lens 1110. The processor(s) 1124 and 1138 may include or be in communication with respective memories 1126 and 1140 that are configured to store respective look-up tables 1128 and 1146 used in performing a self-calibration. The camera system 1100 may be placed on an operating stand or fixture 1104. The camera system 1100 may include an optical chamber 1106 that includes camera sensor 1108 and camera receiving lens 1110. During factory calibration, the camera system 1100 may be configured to image an object 1102 located at a distance D from the front face of the camera receiving lens 1110 by, for example, capturing one or more image(s) of the object 1102. By focusing the object 1102 with the tunable lens, such as the camera receiving lens 1110, voltage levels of one or more elements may be determined and stored along with the distance of the object 1102, as further described herein.

The camera sensor 1108 may be configured to monitor focus condition information corresponding to reflected illumination signals originating from one or more sources, secondary sources, or chamber sources (shown in FIGS. 8A-8B) that may be included the camera system 1100, as described with regard to FIG. 8B. In that regard, when the calibration system is operating, the detector receives the reflected illumination signal and the direct illumination signal may not be seen by the detector. An optical detector may also be used to monitor such signals and corresponding focus condition information, as described with regard to FIG. 8A.

The camera system 1100 may include one or more processor(s) 1124 operably connected to a non-transitory memory 1126, I/O unit 1130, and tunable actuator 1134. The memory 1124 may contain a look-up table 1128 used in performing the self-calibration process. The look-up table 1128 may be created during production of the camera system 1100 and may be automatically updated while in use to account for ageing drift of the camera receiving lens 1110 or another tunable lens. For example, the manufacturer of the camera system 1100 may perform a focus calibration process before the camera system 1100 is sold to a customer, and the camera system 1100 may perform additional focus calibration processes routinely (e.g., periodically or aperiodically) to ensure system operation following a period of use.

During an initial calibration with the calibration station 1136, the camera system 1100 may be driven to establish driving voltages that are stored in the look-up tables 1128 and/or 1146. Thereafter, based on the information included in the look-up table 1128, the processor(s) 1124 may be configured to send a driving voltage signal 1132 to the tunable actuator 1134 to adjust the focus distance of the camera receiving lens 1110. The tunable actuator 1134 may be any electromechanical or liquid tunable device, or any other device, system, etc. configured to adjust a focal distance and/or magnification of an optical device. The tunable actuator 1134 may be, for example, a stepper motor capable of being controlled by a control signal and configured to actuate a back focal distance of the camera receiving lens 1110. In another embodiment, the tunable actuator 1134 may be an electro-wetting device or liquid lens configured to adjust optical properties of one or more lens elements (e.g., by applying a voltage signal to change the surface tension at the interface of two immiscible liquids included in the lens). The processor(s) 1134 may be further configured to monitor focus condition information related to the adjusted focus distance of the camera receiving lens 1110 after the driving voltage signal 1132 is sent the tunable actuator 1134. The processor(s) 1124 may be configured to make further adjustments to the camera receiving lens 1110 (e.g., sending a new driving voltage) based on the focus condition information corresponding to an adjusted focus distance, and this process may be repeated.

In some embodiments, the camera system 1100 may execute the focus calibration process itself. In other embodiments, the focus calibration process may be performed using a calibration station 1136 configured to interact with the camera system 1100, as shown in FIG. 11.

For example, the calibration station 1136 may include one or more processor(s) 1138 that may be operably connected to a memory 1140, database 1142, and I/O unit 1144. The memory 1140 may contain a look-up table 1146 used in performing the self-calibration process. As described with regard to the look-up table 1128 of the camera system 1100, the look-up table 1146 may be created during production of the camera system 1100 and may be updated after the point of sale to account for ageing drift of the camera receiving lens 1110. The look-up table 1146 of the calibration station 1136 may contain the same or different information as the look-up table 1128 of the camera system 1100 and may be used for the same or similar purposes described above or for different purposes. Each camera system calibrated by the calibration station 1136 may have the factory calibration values stored in the look-up table 1146 for records of the manufacturer.

The I/O unit 1144 may be operably connected to both the processor(s) 1138 of the calibration station 1136 and the I/O unit 1130 of the camera system 1100. Accordingly, a signal generated from the processor(s) 1138 may be transmitted via the I/O unit 1144 of the calibration station 1136 to the I/O unit 1130 of the camera system 1100. The signal may then be processed by the processor(s) 1124 of the camera system 1100 and transmitted as the driving voltage signal 1132 to the tunable actuator 1134 to adjust the focus distance of the camera receiving lens 1110.

Further, after transmitting a driving voltage signal via the processor(s) 1124 of the camera system 1100, the processor (s) 1138 of the calibration station 1136 may be configured to receive focus condition information corresponding to the adjusted focus distance. For example, the processor(s) 1124 may be configured to transmit such focus condition information via the I/O unit 1130 of the camera system 1100 to the I/O unit 1144 of the calibration station 1136, where the focus condition information may be received by the processor(s) 1138 and used for updating the look-up table 1146 for performing a self-calibration process. As described above with regard to the processor(s) 1124 of the camera system 1100, the processor(s) 1138 of the calibration station 1136 may be configured to make further adjustments to the camera receiving lens 1110 (e.g., sending a new driving voltage) based on the focus condition information received via the camera system 1100, and this process may be repeated to determine that the focus of the tunable lens is complete.

With regard to FIG. 12, an illustration of an illustrative look-up table 1200 used in performing a self-calibration is shown. From time of production of the camera system including populating the look-up table 1200 and onward, the look-up table 1200 may undergo various updates and permutations that may result in the configuration (or format) as shown on FIG. 12. An illustrative process for updating the look-up table is described in greater detail below.

At the time of manufacturing of the camera system corresponding to the look-up table 1200, the first (or initial) calibration may be performed, creating a first setting of the calibration values of the look-up table 1200. The first calibration may be performed in two steps. In the first step, for example, targets may be placed at a number of known focus distances $F_D$ from the camera system and the driving signals $D_s$ (i.e., the signals that cause the tunable camera receiving lens to be adjusted such that the images of the various targets are in focus at each distance) may be determined. Accordingly, the first setting of the look-up table 1200 at the manufacturing stage may include (i) a column 1202 with respective driving signals $D_s$ and (ii) a column 1204 with respective focus distances $F_D$ corresponding to each of the various targets used in the first calibration process. As such, the first setting of the look-up table may show the initial relationship between tunable lens driving signal $D_s$ and focus distance $F_D$. In particular, the driving signals $D_s$ may represent a signal (e.g., voltage) transmitted to a tunable actuator to calibrate the tunable lens to be at respective focus distances $F_D$ that are associated with respective detector signals S, as further described herein.

In the second part of the first calibration, each of the respective driving signals $D_s$ included in the first setting of the look-up table 1200 may be transmitted to an actuator configured to adjust the focus distance of the camera receiving lens, as described with regard to FIG. 11. For each of the driving signals $D_s$ included in the look-up table 1200, a respective detector signal S corresponding to the signal (e.g., reflected illumination signal) received by an included detecting element may be measured and recorded as a third column 1206 in the look-up table 1200 (e.g., in the row corresponding to the respective driving signal $D_s$ transmitted to the actuator). As such, the second update of the look-up 1200 table may show the relationship between tunable lens driving signal $D_s$, focus distance $F_D$, and detector signal S as shown in FIG. 12. The second part of the first calibration process may be performed immediately after the first part of the first calibration process or at some other time following the performance of the first part of the first calibration process. Moreover, rather than overwriting the data, the camera system may add to the look-up table 1200 so that measurements over time may be accessed and viewed. Also, factory settings may be maintained for later viewing or resetting.

After the second part of the first calibration process has been performed, a user of the camera system may perform an operating calibration process, creating a further update of the look-up table 1200. For example, imagine that a period of time has passed and tunable lens ageing drift has occurred following completion of the first calibration process. It should be understood that the camera may be configured to automatically perform a re-calibration as opposed to a human user having to physically or remotely initiate a calibration process. Each of the respective driving signals $D_s$ included in the previous (e.g., second) update of the look-up table 1200 may be transmitted to the actuator to adjust the focus distance of the camera receiving lens, and new respective detector signals S corresponding to each signal received by the included detecting element may be measured in the same manner as the previous detector signals S from the second part of the first calibration process (as described above). Depending on the conditions of the camera system, the new signal S corresponding to the signal received by the detecting element in the operating calibration process may vary from the respective previous signal S corresponding to the second part of the first calibration process. In another example, in response to determining a difference between a new detector signal and stored detector signal, the camera system may vary the driving signal sent to the tunable lens to determine that the detector signal replicates each stored detector value already included in the look-up table 1200. Each of the driving signals $D_s$ used to replicate each stored detector value may be stored in column 1202 and replace the previously stored driving signals $D_s$ (e.g., the driving signals stored during the second part of the first calibration process). Additional calibration processes (e.g., a second, a third, a fourth, fifth, sixth, etc.) may be performed routinely (e.g., periodically or aperiodically) to maintain normal operation of the camera system.

According to an example, the camera system may be focused at a known distance $F_D$ with a corresponding driving signal $D_s$. When calibration is needed, the calibration system may be turned ON and the detector signal S may be measured without adjusting the driving signal sent to the camera receiving lens (or tunable lens). If the tunable lens behavior has varied (e.g., due to ageing or thermal drift), there may be small offset $\Delta_S$ between the stored (or expected) signal $\Delta_{Ss}$ and the measured signal $\Delta_{Sm}$ ($\Delta_S = \Delta_{Ss} - \Delta_{Sm}$). The camera system may then vary the driving signal sent to the tunable lens by a small amount $\Delta_{Ds}$ such that the offset between the stored signal and expected signal is negligible ($\Delta_S \approx 0$). This offset may then be added to the remaining set of driving signal values included in the look-up table. The amount $\Delta_{Ds}$ by which each driving signal is varied may be determined by trial and error or by a using a functional dependence that may be characterized at the production stage of the camera system.

It is worth noting that the values included in the look-up table 1200 may vary with temperature, and the calibration process may be repeated at various temperatures so that a look-up table corresponding to each temperature may be generated. Further, the relationship described by the data in the table (e.g., the relationship between focus distance and detector signal) may change following degradation of the tunable lens or other camera system elements, and additional calibration process(es) may be performed to account for this change.

In an example, the camera system images real-world objects and the calibration system may be turned OFF during normal operation of the camera system. When the camera system is to be calibrated, it may optionally switch OFF a main illumination system, may reduce the exposure time to decrease the imaged brightness of the objects, and may turn a calibration system ON. In this example, the calibration source may be very bright and may provide the only meaningful signal for the detecting element.

Figure 13:
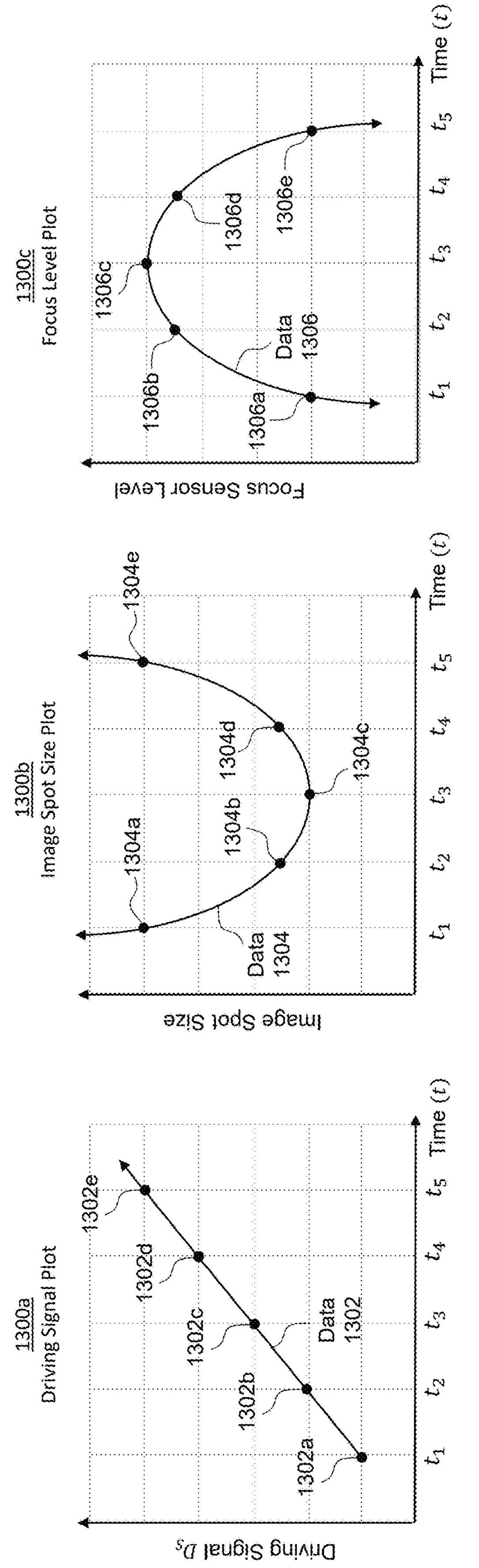
FIG. 13 is an illustration of an illustrative (i) driving signal plot with data corresponding to the driving signal (e.g., voltage) transmitted to the tunable actuator, (ii) image spot size plot with data corresponding to the respective image sizes of an object imaged by the camera system after adjusting the driving voltage, and (iii) focus level plot with data corresponding to the focus level of an object imaged by the camera system after adjusting the driving voltage over time.

With regard to FIG. 13, an illustration of an illustrative (i) driving signal plot 1300*a* with data 1302 corresponding to the driving signal (e.g., voltage) transmitted to the tunable actuator, (ii) image spot size plot 1300*b* with data 1304 corresponding to the respective image sizes of an object imaged by the camera system after adjusting the driving voltage, and (iii) focus level plot 1300*c* with data 1306 corresponding to the focus level of an object imaged by the camera system after adjusting the driving voltage over time is shown.

The data 1302 of the driving signal plot 1300*a* may include data points 1302*a*-1302*e* that may correspond to respective driving signals $D_s$ transmitted by the camera system to an actuator configured to adjust the focus conditions of an included camera receiving lens during a focus calibration process. For example, the data point 1302*a* may correspond to the driving signal $D_{s1}$ transmitted during a first focus calibration process at a time $t_1$, the data point 1302*b* may correspond to the driving signal $D_{s2}$ transmitted during the first focus calibration process at a time $t_2$, and so on. In performing a self-calibration, the camera system may increase the driving signal $D_s$ corresponding to a time t by a predefined amount (e.g., using a step function) at each interval. While this approach is reflected in the data 1302 driving signal plot 1300*a* (e.g., each of the data points 1302*a*-1302*e* are increasing by equal amounts), it should be understood that additional and/or alternative systems, devices, methods, and approaches may be used for adjusting the driving signal $D_s$ during a self-calibration.

The data 1304 of the image spot size plot 1300*b* may include data points 1304*a*-1304*e*, which may correspond to the respective image sizes of an object imaged by the camera system after adjusting the driving signal to the values indicated by data points 1302*a*-1302*e* of the driving signal plot 1300*a*. For example, the data point 1304*a* may correspond to the image spot size of an image corresponding to the driving signal $D_{s1}$ transmitted during the first focus calibration process at a time $t_1$ (as described in the paragraph above). The data point 1304*b* may correspond to the image spot size of an image corresponding to the driving signal $D_{s2}$ transmitted at a time $t_2$, and so on. The camera system may be configured to compare each of the image spot size values (shown as data points 1304*a*-1304*e*) to one or more predefined value(s) stored by the camera system (as described with regard to FIG. 14) or to maximize/minimize one or more value(s) associated with the camera system, as described below. For example, the camera system may be configured to minimize the image spot size (or smallest amount of blur) of an object imaged by the camera system in performing a self-calibration. As shown, the data 1304 of the image spot size plot 1300*b* has a negative peak (data point 1304*c*) corresponding to the minimum image spot of the object at the time $t_3$. This value may be selected, and the corresponding driving signal value (shown as the data point 1302*c* of the driving signal plot 1300*a*) may then be used for updating a look-up table of the camera system and/or for adjusting the camera receiving lens or other tunable lens of the camera system.

The data 1306 of the focus level plot 1300*c* may include data points 1306*a*-1306*e*, which may correspond to the respective focus levels of the images received by an optical detector after adjusting the driving signal to the values indicated by data points 1302*a*-1302*e* of the driving signal plot 1300*a*. For example, the data point 1306*a* may correspond to the focus level of the image corresponding to the driving signal $D_{s1}$ transmitted during the first focus calibration process at a time $t_1$ (as described in the above paragraphs). The data point 1306*b* may correspond to the focus level of an image corresponding to the driving signal $D_{s2}$ transmitted at a time $t_2$, and so on. The camera system may be configured to compare each of the focus level values (shown as data points 1306*a*-1306*e*) to one or more predefined value(s) stored by the camera system (as described with regard to FIG. 14) or to maximize/minimize one or more value(s) associated with the camera system, as described below. For example, the camera system may be configured to maximize the focus level (e.g., brightest image on the detector) of an object imaged by the camera system in performing a self-calibration. As shown, the data 1306 of the focus level plot 1300*c* has a positive peak (data point 1306*c*) corresponding to the maximum focus level of an image of the object at the time $t_3$. This value may be selected, and the corresponding driving signal value (shown as the data point 1302*c* of the driving signal plot 1300*a*) may then be used for updating a look-up table of the camera system and/or for adjusting the tunable lens of the camera system.

Figure 14:
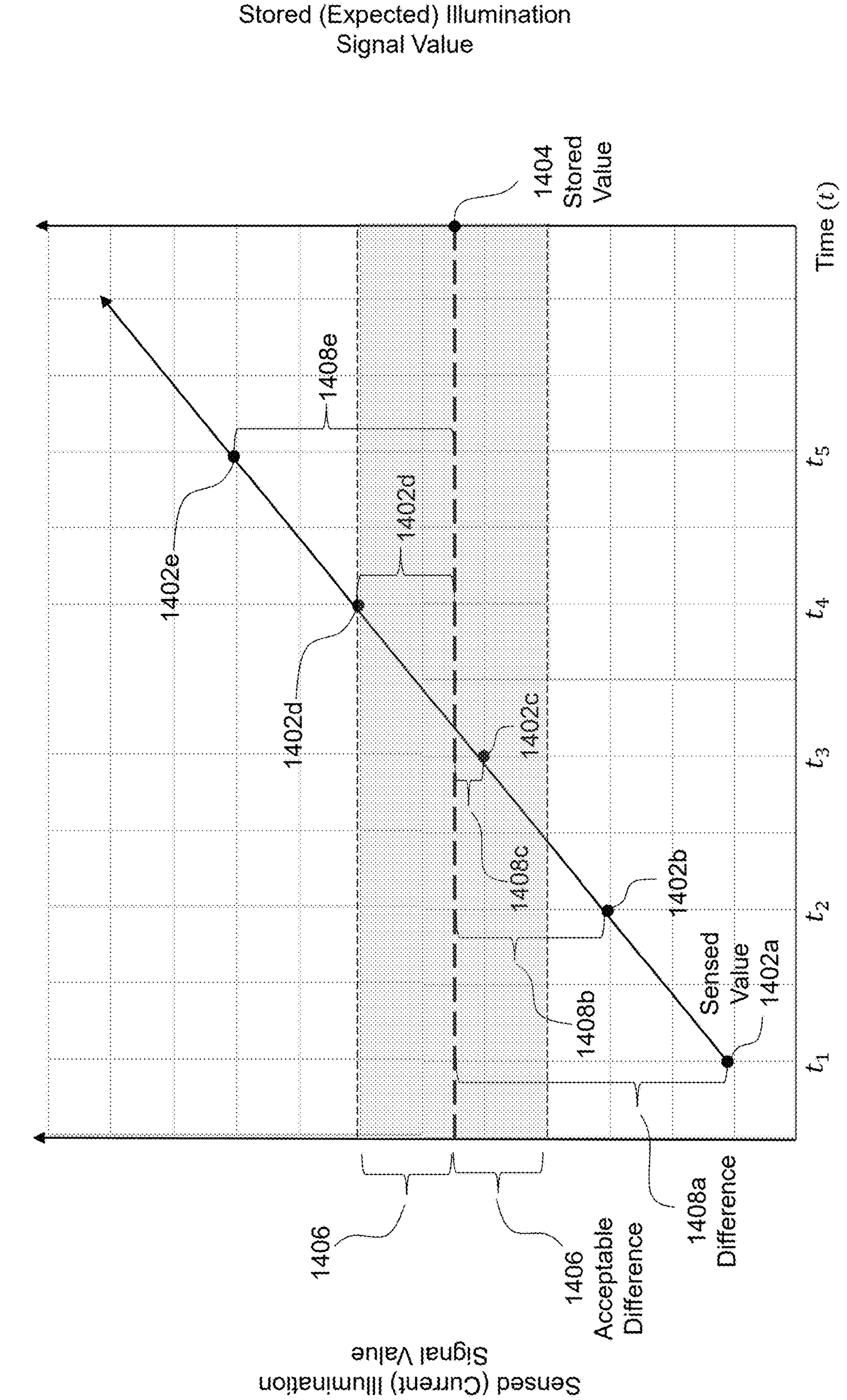
FIG. 14 is an illustration of an illustrative plot showing a stored (or expected) illumination signal value, multiple measured (or sensed) illumination values, and differences between the stored illumination signal value and measured illumination values over time.

With regard to FIG. 14, an illustration of an illustrative plot 1400 showing a stored (or expected) illumination signal value 1404, multiple sensed (or current) illumination values 1402*a*-1402*e* (collectively 1402), and differences 1408*a*-1408*e* (collectively 1408) between the stored illumination signal value 1404 and sensed illumination values 1402 over time is shown. The stored illumination signal value 1404 may be any pre-defined value (e.g., image spot size, focus level, etc.) that may be stored in the camera system (e.g., in an included look-up table) and may be used in performing a self-calibration. Further, an acceptable difference 1406 may define an acceptable range (shaded in FIG. 14) from the stored illumination value 1404 from which the stored illumination values 1402 may depart (e.g., ±5% from the stored value, less than one standard deviation from the stored value, etc.). For each of the sensed illumination values 1402, the camera system may compare the sensed illumination value to the stored illumination signal value 1404, calculate a difference (shown as differences 1408) between the two values, and determine whether any of the sensed illumination values 1402 fall within the acceptable range defined by the acceptable difference 1406.

As an example, the sensed illumination values 1402 at times $t_1$-$t_5$ may be sensed image spot size values 1402*a*-

1402*e* corresponding to data points 1304*a*-1304*e* of the image spot size plot 1300*b* of FIG. 13 if using a camera sensor for the self-calibration process. For example, the sensed image spot size value 1402*a* may be compared to a stored (or expected) image spot size value 1404 that is known to the camera system, and a difference 1408*a* between the sensed image spot size value 1402*a* and the stored image spot size value 1404 may be calculated. This process may be repeated by calculating the differences 1408*b*-1408*e* corresponding to the differences between the sensed image spot size values 1402*b*-1402*e* and the stored image spot size value 1404. Each of the differences 1408 may be compared to an acceptable difference value 1406 to determine whether the sensed image spot size value is within an acceptable predefined range (shaded on FIG. 14). At the end of the focus calibration process, the camera system may select a sensed image spot size value having a difference that is less than or equal to the acceptable difference 1406 (i.e., a sensed image spot size value falling within the acceptable predefined range). For example, the sensed image spot size value 1402*c* or 1402*d* may be selected, as both fall within the acceptable range defined by the acceptable difference 1406. The sensed image spot size value 1402*a*, 1402*b*, and 1402*e* are not suitable as none of these values fall within the predefined range. As shown on FIG. 14, the camera system may select the sensed image spot size value with the smallest difference (e.g., sensed image spot size value 1402*c*) to be further utilized in the self-calibration process. The camera system may further update a look-up table (as described with regard to FIGS. 11-12) with the driving signal $D_s$ corresponding to the sensed illumination signal value 1400 or otherwise use the sensed illumination signal value 1400 in the self-calibration process. For example, the camera system may update the look-up table with the driving signal $D_{s3}$ corresponding to the sensed illumination signal value 1402*c* or otherwise use the sensed illumination signal value 1402*c* in the self-calibration process. While the above example describes using image spot size as the sensed illumination value, any suitable illumination value may be used (e.g., focus level as described with regard to FIG. 13, optical flux, etc.).

As described herein and wherein, the systems, methods, devices, and principles disclosed enable performance of a focus distance calibration process of a camera system without requiring external setup or the intervention of an operator.

For example, an in-chamber device and method for calibrating a tunable-focus camera system may be used to restore the optical stability of a tunable lens and improve the performance of the camera system. In particular, one embodiment relates to an optical chamber. The optical chamber may include a housing, a camera sensor, a camera receiving lens, and an illumination source. The housing may define an aperture, and the camera sensor may be disposed within the housing. The camera receiving lens may be disposed in the aperture of the housing and be configured to enable light external of the optical chamber to be focused onto the camera sensor. The illumination source may be configured to output an illumination signal that is incident the camera receiving lens along a first axis via the camera receiving lens. The illumination signal may be reflected from a reflective element as a reflected illumination signal back through a second axis via the camera receiving lens so as to enable the reflected illumination signal to be sensed.

In another embodiment, the optical chamber may further include an optical detector optically aligned with the second axis so that the reflected illumination signal is incident the optical detector.

The optical detector may be on a common plane as the camera sensor.

Another embodiment may further include at least one second illumination source configured to output a second illumination signal that is incident the camera receiving lens. The second illumination signal may be output along a third axis to be reflected from the reflective element as a second reflected illumination signal back through a fourth axis via the camera receiving lens so as to enable the second reflected illumination signal to be sensed.

The reflective element may be embedded in the camera receiving lens.

The camera receiving lens may be a tunable camera receiving lens.

Another embodiment relates to a system that may include a first housing, a window, an optical chamber, and electronics. The first housing may define a first aperture, and the window may be positioned at the first aperture to enable light to enter the window into the first housing. An optical chamber may be disposed within the first housing and include a second housing, a camera sensor, a camera receiving lens, and an illumination source. The second housing may define a second aperture, and the camera sensor may be disposed within the second housing. The camera receiving lens may be disposed within the aperture of the second housing and be configured to enable light external from the optical chamber that enters the camera receiving lens to be focused onto the camera sensor. The illumination source may be configured to output an illumination signal that is incident the camera receiving lens along a first axis via the camera receiving lens. The illumination signal may be reflected from a reflective element as a reflected illumination signal back through a second axis via the camera receiving lens so as to enable the reflected illumination signal to be sensed. The electronics may be in electrical communication with the camera sensor and configured to execute a focus calibration process by processing a sensed reflected illumination signal based on the reflected illumination signal. The electronics may be further configured to apply a control signal to cause at least one actuator to be adjusted in response to determining that the sensed reflected sensed illumination signal indicates that the camera receiving lens is out of focus to determine that the sensed reflected illumination signal indicates that the camera receiving lens is in focus.

In another embodiment, the camera receiving lens is a tunable camera receiving lens inclusive of the actuator(s). The actuator(s) are in electrical communication with the electronics to adjust the focus conditions of at least one lens of the tunable camera receiving lens.

The system may further include a reflective element disposed within the first housing and optically aligned with the camera receiving lens to enable the illumination signal from the illumination source to be reflected therefrom so as to form the reflected illumination signal.

The reflective element may have a reflective surface that is substantially orthogonal with an optical axis that is orthogonal with the camera sensor.

The system may further include an optical detector located within the optical chamber, and aligned with the second axis so that the reflected illumination signal is incident the optical detector and generates the sensed reflected illumination signal.

The optical detector may be at a first distance from the camera receiving lens. The system may further include a second optical detector at a second distance from the camera receiving lens and generate a second sensed reflected illumination signal to be used by the focus calibration process.

According to another embodiment, the electronics may include at least one processor configured to operate the system and execute software instructions to perform the focus calibration process. The electronics may further include a non-transitory memory in electrical communication with the processor(s). The non-transitory memory may be configured to store a look-up table inclusive of a calibrated driving signal, calibrated focus distance, and calibrated sensed reflected illumination signal associated with the calibrated focus distance. The processor(s), in executing the focus calibration process, may be configured to measure the sensed reflected illumination signal, calculate a difference between the measured sensed reflected illumination signal and stored calibrated reflected illumination signal to generate a difference sensed reflected illumination signal, and determine a new driving signal based on the difference sensed reflected illumination signal. The processor(s) may be configured to output the new driving signal to cause at least one actuator to be adjusted, repeat the focus calibration process to determine that the difference sensed reflection illumination signal is within a predetermined range, and store a final new driving signal.

Another embodiment relates to a method of calibrating a camera system. The method may include storing, in a non-transitory memory, a look-up table inclusive of a calibrated driving signal, calibrated focus distance, and calibrated sensed reflected signal associated with the calibrated focus distance. The method may include directing, from within the camera system, an illumination signal via a camera receiving lens towards outside the camera system to be reflected back through the camera receiving lens as a reflected illumination signal. The method may further include sensing the reflected illumination signal as a sensed reflected illumination signal and measuring the sensed reflected illumination signal as a measured reflected illumination signal. The method may include calculating a difference between the measured sensed reflected illumination signal and stored calibrated reflected illumination signal to generate a difference sensed reflected illumination signal. Further, the method may include determining a new driving signal based on the difference sensed reflected illumination signal and outputting the driving signal to cause at least one actuator to be adjusted. Directing, sensing, measuring, calculating, determining, and outputting may be repeated to determine that the difference sensed reflected illumination signal is within a predetermined range, and storing a final new driving signal.

In an embodiment, outputting the driving signal may include outputting the driving signal to cause a liquid adjustable lens to move towards a position at which light that enters the camera system via the camera receiving lens is more in focus on a camera sensor.

Directing the illumination signal may include directing the illumination signal via the camera receiving lens to be reflected from a reflective element positioned within a housing of the camera system.

Sensing the reflected illumination signal may include sensing the reflected illumination signal using an optical detector independent from a camera sensor configured to sense optical signals from the camera receiving lens.

Another embodiment may further include determining that the difference sensed reflected illumination signal is at a minimum and setting the final new driving signal to the new driving signal corresponding to the difference sensed reflected illumination signal at the minimum.

Another embodiment may further include adjusting a driving signal that causes the camera receiving lens to focus an image of an object that is positioned at a known distance from the camera system onto the camera sensor. It may include storing a driving signal value of the driving signal when the image of the object is in focus, the stored driving signal value being the calibrated driving signal in the look-up table. It may also include determining a focus and directing, from within the camera system, a calibration illumination signal via the camera receiving lens towards outside the camera system to be reflected back through the camera receiving lens as a reflected calibration illumination signal. An embodiment may further include sensing the reflected illumination signal as a sensed reflected illumination signal, measuring the sensed reflected calibration illumination signal, and storing the sensed reflected calibration illumination signal as the calibrated sensed reflected illumination signal associated with the calibrated focus distance. It may further include storing, in a non-transitory memory, the look-up table including at least one second calibrated driving signal, at least one second calibrated focus distance, and at least one second calibrated sensed reflected illumination signal associated with the at least one second calibrated focus distance. It may include directing, from within the camera system, an illumination signal via a camera receiving lens towards outside the camera system to be reflected back through the camera receiving lens as a reflected illumination signal and sensing the reflected illumination signal as at least one second sensed reflected illumination signal. An embodiment may include measuring the at least one second sensed reflected illumination signal as at least one second measured sensed reflected illumination signal and calculating a difference between the at least one second measured sensed reflected illumination signal and at least one second stored calibrated reflected illumination signal to generate at least one second difference sensed reflected illumination signal. It may further include determining at least one second new driving signal based on the at least one second difference sensed reflected illumination signal and outputting the at least one second driving signal to cause the at least one actuator to be adjusted. Directing, sensing, measuring, calculating, determining, and outputting may be repeated to determine that the at least one second difference sensed reflection illumination signal is within a predetermined range, and a final at least one second new driving signal may be stored.

Another embodiment may further include automatically directing, sensing, measuring, calculating, determining, outputting, repeating, and storing periodically or aperiodically.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed is:

1. A camera system, comprising:

an optical chamber including:

- an optical chamber housing defining an aperture;
- a camera sensor disposed within the optical chamber housing;
- a camera receiving lens disposed in the aperture of the optical chamber housing, and configured to enable light external of the optical chamber to be focused onto the camera sensor; and
- an illumination source disposed within the optical chamber housing proximate the camera sensor and creating a double pass system with the camera receiving lens and a reflective element such that the illumination source is configured to output an illumination signal that is incident the camera receiving lens to pass through the camera receiving lens along a first axis to be reflected from a reflective element as a reflected illumination signal that is passed back through the camera receiving lens along a second axis so as to enable the reflected illumination signal to be sensed.

2. The camera system according to claim 1, further comprising an optical detector disposed within the optical chamber housing and optically aligned with the second axis so that the reflected illumination signal is incident the optical detector.

3. The camera system according to claim 2, wherein the optical detector is different than the camera sensor and on a common plane as the camera sensor.

4. The camera system according to claim 2, wherein the reflective element is disposed within the first optical chamber housing and optically aligned with the camera receiving lens to enable the illumination signal from the illumination source to be reflected therefrom so as to form the reflected illumination signal.

5. The camera system according to claim 4, wherein the reflective element has a reflective surface that is substantially orthogonal with an output optical axis that is orthogonal with the camera sensor such that the reflected illumination signal is directed to the optical detector that is different than the camera sensor.

6. The camera system according to claim 4, wherein the reflective element has a reflective surface that is tilted with an output optical axis that is incident with the camera sensor such that the reflected illumination signal is directed to the camera sensor acting as the optical detector.

7. The camera system according to claim 1, further comprising at least one second illumination source disposed within the optical chamber housing and configured to output a second illumination signal that is incident the camera receiving lens to pass through the camera receiving lens along a third axis to be reflected from the reflective element as a second reflected illumination signal that is passed back through the camera receiving lens along a fourth axis so as to enable the second reflected illumination signal to be sensed.

8. The camera system according to claim 1, wherein the reflective element is embedded in the camera receiving lens.

9. The camera system according to claim 1, wherein the camera receiving lens is a tunable camera receiving lens.

10. The camera system according to claim 1, further comprising:
- electronics in electrical communication with the camera sensor, and configured to:
  - execute a focus calibration process by processing a sensed reflected illumination signal based on the reflected illumination signal; and
  - apply a control signal to cause at least one actuator to be adjusted in response to determining that the sensed reflected sensed illumination signal indicates that the camera receiving lens is out of focus to determine that the sensed reflected illumination signal indicates that the camera receiving lens is in focus.

11. The camera system according to claim 10, wherein the camera receiving lens is a tunable camera receiving lens inclusive of the at least one actuator in electrical communication with the electronics to adjust the focus conditions at least one lens of the tunable camera receiving lens.

12. The camera system according to claim 10,
- wherein the optical detector is at a first distance from the camera receiving lens; and
- further comprising a second optical detector being at a second distance from the camera receiving lens, and generates a second sensed reflected illumination signal to be used by the focus calibration process.

13. The camera system according to claim 10, wherein the electronics include:
- at least one processor configured to operate the system and execute software instructions to perform the focus calibration process;
- a non-transitory memory in electrical communication with the at least one processor, and configured to store a look-up table inclusive of a calibrated driving signal, calibrated focus distance, and calibrated sensed reflected illumination signal associated with the calibrated focus distance; and
- wherein the at least one processor, in executing the focus calibration process, is configured to:
  - measure the sensed reflected illumination signal;
  - calculate a difference between the measured sensed reflected illumination signal and stored calibrated reflected illumination signal to generate a difference sensed reflected illumination signal;
  - determine a new driving signal based on the difference sensed reflected illumination signal;
  - output the new driving signal to cause at least one actuator to be adjusted;
  - repeat the focus calibration process to determine that the difference sensed reflection illumination signal is within a predetermined range; and
  - store a final new driving signal.

14. The camera system according to claim 1, wherein the reflective element is located on or integrated within an external window of the camera system.

15. A method of calibrating a camera system, comprising:
- storing, in a non-transitory memory, a look-up table inclusive of a calibrated driving signal, calibrated focus distance, and calibrated sensed reflected illumination signal associated with the calibrated focus distance;
- outputting, from an illumination source disposed within an optical chamber of the camera system that creates a double pass system with a reflective element;
- directing the illumination signal through the camera receiving lens along a first axis to be reflected back by the reflective element passing through the camera receiving lens as a reflected illumination signal along a second axis;
- sensing, via a camera sensor disposed within the optical chamber proximate to the illumination source, the reflected illumination signal as a sensed reflected illumination signal;
- measuring the sensed reflected illumination signal as a measured reflected illumination signal;
- calculating a difference between the measured reflected illumination signal and stored calibrated reflected illumination signal to generate a difference sensed reflected illumination signal;
- determining a new driving signal based on the difference sensed reflected illumination signal;
- outputting the driving signal to cause the at least one actuator to be adjusted;
- repeating directing, sensing, measuring, calculating, determining, and outputting, determining that the difference sensed reflected illumination signal is within a predetermined range; and
- storing a final new driving signal.

16. The method according to claim 15, wherein outputting the driving signal includes outputting the driving signal to cause a liquid adjustable lens to move towards a position at which light that enters the camera system via the camera receiving lens is more in focus on the camera sensor.

17. The method according to claim 15, wherein directing the illumination signal includes directing the illumination signal via the camera receiving lens to be reflected from a reflective element positioned within a housing of the camera system.

18. The method according to claim 15, further comprising:

determining that the difference sensed reflected illumination signal is at a minimum;

setting the final new driving signal to the new driving signal corresponding to the difference sensed reflected illumination signal at the minimum;

adjusting a driving signal that causes the camera receiving lens to focus an image of an object that is positioned at a known distance from the camera system onto a camera sensor;

storing a driving signal value of the driving signal when the image of the object is in focus, the stored driving signal value being the calibrated driving signal in the look-up table;

determining a focus;

directing, from within the camera system, a calibration illumination signal via the camera receiving lens towards outside the camera system to be reflected back through the camera receiving lens as a reflected calibration illumination signal;

sensing the reflected illumination signal as a sensed reflected illumination signal;

measuring the sensed reflected calibration illumination signal;

storing the sensed reflected calibration illumination signal as the calibrated sensed reflected illumination signal associated with the calibrated focus distance;

storing, in a non-transitory memory, the look-up table inclusive of at least one second calibrated driving signal, at least one second calibrated focus distance, and at least one second calibrated sensed reflected illumination signal associated with the at least one second calibrated focus distance;

directing, from within the camera system, an illumination signal via a camera receiving lens towards outside the camera system to be reflected back through the camera receiving lens as a reflected illumination signal;

sensing the reflected illumination signal as at least one second sensed reflected illumination signal;

measuring the at least one second sensed reflected illumination signal as at least one second measured sensed reflected illumination signal;

calculating a difference between the at least one second measured sensed reflected illumination signal and at least one second stored calibrated reflected illumination signal to generate at least one second difference sensed reflected illumination signal;

determining at least one second new driving signal based on the at least one second difference sensed reflected illumination signal;

outputting the at least one second driving signal to cause the at least one actuator to be adjusted;

repeating directing, sensing, measuring, calculating, determining, and outputting, determining that the at least one second difference sensed reflection illumination signal is within a predetermined range; and storing a final at least one second new driving signal.

19. The method according to claim 15, further comprising automatically directing, sensing, measuring, calculating, determining, outputting, repeating, and storing periodically or aperiodically.

20. A method of calibrating a camera system, comprising:

storing, in a non-transitory memory, a look-up table inclusive of a calibrated driving signal, calibrated focus distance, and calibrated sensed reflected illumination signal associated with the calibrated focus distance;

directing, from within the camera system, an illumination signal via a camera receiving lens towards outside the camera system to be reflected back through the camera receiving lens as a reflected illumination signal;

sensing the reflected illumination signal as a sensed reflected illumination signal, wherein sensing the reflected illumination signal includes sensing the reflected illumination signal using an optical detector independent from a camera sensor configured to sense optical signals from the camera receiving lens;

measuring the sensed reflected illumination signal as a measured reflected illumination signal;

calculating a difference between the measured reflected illumination signal and stored calibrated reflected illumination signal to generate a difference sensed reflected illumination signal;

determining a new driving signal based on the difference sensed reflected illumination signal;

outputting the driving signal to cause the at least one actuator to be adjusted;

repeating directing, sensing, measuring, calculating, determining, and outputting, determining that the difference sensed reflected illumination signal is within a predetermined range; and storing a final new driving signal.

* * * * *